(12) United States Patent
Zhao et al.

(10) Patent No.: US 11,044,492 B2
(45) Date of Patent: Jun. 22, 2021

(54) RESIDUAL CODING FOR TRANSFORM SKIP MODE AND BLOCK DIFFERENTIAL PULSE-CODE MODULATION

(71) Applicant: Tencent America LLC, Palo Alto, CA (US)

(72) Inventors: Xin Zhao, San Diego, CA (US); Xiang Li, Saratoga, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 16/799,358

(22) Filed: Feb. 24, 2020

(65) Prior Publication Data

US 2020/0275121 A1    Aug. 27, 2020

Related U.S. Application Data

(60) Provisional application No. 62/809,677, filed on Feb. 24, 2019.

(51) Int. Cl.
| | |
|---|---|
| H04N 19/547 | (2014.01) |
| H04N 19/132 | (2014.01) |
| H04N 19/176 | (2014.01) |
| H04N 19/70 | (2014.01) |
| H04N 19/18 | (2014.01) |
| H04N 19/184 | (2014.01) |
| H04N 19/64 | (2014.01) |
| H04N 19/12 | (2014.01) |

(52) U.S. Cl.
CPC ........... *H04N 19/547* (2014.11); *H04N 19/12* (2014.11); *H04N 19/132* (2014.11); *H04N 19/176* (2014.11); *H04N 19/18* (2014.11); *H04N 19/184* (2014.11); *H04N 19/64* (2014.11); *H04N 19/70* (2014.11)

(58) Field of Classification Search
CPC .................................................... H04N 19/70
See application file for complete search history.

(56) References Cited

U.S. PATENT DOCUMENTS

2005/0123207 A1* 6/2005 Marpe .................. H04N 19/196
382/239

* cited by examiner

*Primary Examiner* — Young Lee
(74) *Attorney, Agent, or Firm* — Oblon, McClelland, Maier & Neustadt, L.L.P.

(57) ABSTRACT

A method of video decoding performed in a video decoder is provided. A bit stream including bins of syntax elements is received. The syntax elements correspond to coefficients of a region of a transform skipped block in a coded picture. The syntax elements include a first flag indicating whether an absolute coefficient level of one of the coefficients is greater than a first threshold value, and a second flag indicating a parity of the absolute coefficient level. The second flag is decoded in a pass. The pass satisfies at least one of: (1) no other syntax elements is decoded in the pass; (2) a third flag indicating whether the absolute coefficient level is greater than a second threshold value is decoded in the pass; and (3) a fourth flag indicating sign information of the coefficient level of the one of the coefficients is decoded in the pass.

11 Claims, 19 Drawing Sheets

RESIDUAL CODING FOR TRANSFORM SKIP MODE AND BLOCK DIFFERENTIAL PULSE-CODE MODULATION

INCORPORATION BY REFERENCE

This present application claims the benefit of priority to U.S. Provisional Application No. 62/809,677, "Improved Residual Coding for Transform Skip Mode and Block Differential Pulse-Code Modulation" filed on Feb. 24, 2019, which is hereby incorporated by reference in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920× 1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of a neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding," December 2016).

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video coding at a decoder. In some examples, a bit stream including bins of syntax elements is received. The syntax elements correspond to coefficients of a region of a transform skipped block in a coded picture. The syntax elements include a first flag indicating whether an absolute coefficient level of one of the coefficients is greater than a first threshold value, and a second flag indicating a parity of the absolute coefficient level. The second flag is decoded in a pass. The pass satisfies at least one of: (1) no other syntax elements is decoded in the pass; (2) a third flag indicating whether the absolute coefficient level is greater than a second threshold value is decoded in the pass; and (3) a fourth flag indicating sign information of the coefficient level of the one of the coefficients is decoded in the pass. The second threshold value being greater than the first threshold value.

In an embodiment, the first threshold value is 1 and the second threshold value is 3.

In an embodiment, a current block corresponding to the transform skipped block is coded with a block differential pulse-code modulation mode.

In an embodiment, the second flag is decoded in the pass without decoding other syntax elements after decoding the first flag and a fifth flag indicating whether the absolute coefficient level is greater than 3 in a previous pass.

In an embodiment, the second flag is decoded in the pass without decoding other syntax elements after decoding the third flag in a previous pass.

In an embodiment, the second flag is decoded in the same pass with the third flag.

In an embodiment, the second flag is decoded in the same pass with the fourth flag.

In some example, a bit stream including bins of syntax elements is received. The syntax elements correspond to coefficients of a region of a transform skipped block in a coded picture. The syntax elements include a first flag indicating whether an absolute coefficient level of one of the coefficients is greater than a first threshold value, and a second flag indicating whether the absolute coefficient level of the one of the coefficients is greater than a second threshold value. The second threshold value is greater than the first threshold value. A number of the bins of the second flag that are context coded is determined based on coded information of the coefficients. Context modeling is performed to determine a context model for each of the number of the bins of the second flag. The number of the bins of the second flag is decoded based on the determined context models.

In an embodiment, the first threshold value is 1 and the second threshold value is 3.

In an embodiment, the coded information of the coefficients includes a number of the first flag in a current coefficient group (CG) including the coefficients, a number the first flag in a previous CG, whether a current block corresponding to the transform skipped block is intra coded or inter coded, a size of the transform skipped block, a width of the transformed skipped block, a height of the transformed skipped block, or an aspect ratio of the transformed skipped block.

In an embodiment, when the current block is intra coded, the number of the bins of the second flag is more than the number of the bins of the second flag when the current block is inter coded.

In some examples, a bit stream including bins of syntax elements is received. The syntax elements correspond to coefficients included in a coefficient group (CG) of a transform skipped block in a coded picture. A maximum number of context coded bins of the CG or a maximum average number of context coded bins of the CG is determined based on coded information of the coefficients. Context modeling is performed to determine a context model for each of a number of the bins of syntax elements in the CG. The number of the bins of syntax elements in the CG being context coded does not exceed the maximum number of context coded bins of the CG or the maximum average number of context coded bins of the CG. The number of the bins of syntax elements is decoded based on the determined context models.

In an embodiment, the coded information of the coefficients includes a number of the first flag in the CG including the coefficients, a number the first flag in a previous CG, whether a current block corresponding to the transform skipped block is intra coded or inter coded, a size of the transform skipped block, a width of the transformed skipped block, a height of the transformed skipped block, or an aspect ratio of the transformed skipped block.

Aspects of the disclosure also provide non-transitory computer-readable storage mediums storing instructions which when executed by a computer cause the computer to perform any of the above methods.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

I. Video Coding Encoder and Decoder

Figure 1:
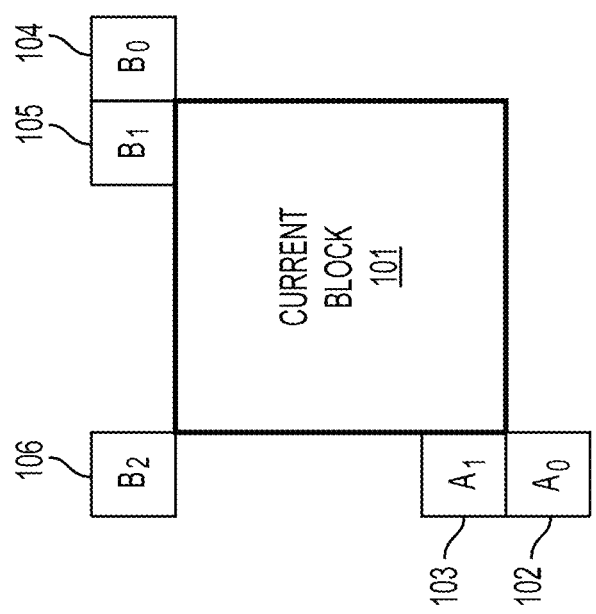
FIG. 1 is a schematic illustration of a current block and its surrounding spatial merge candidates in one example.
Figure 2:
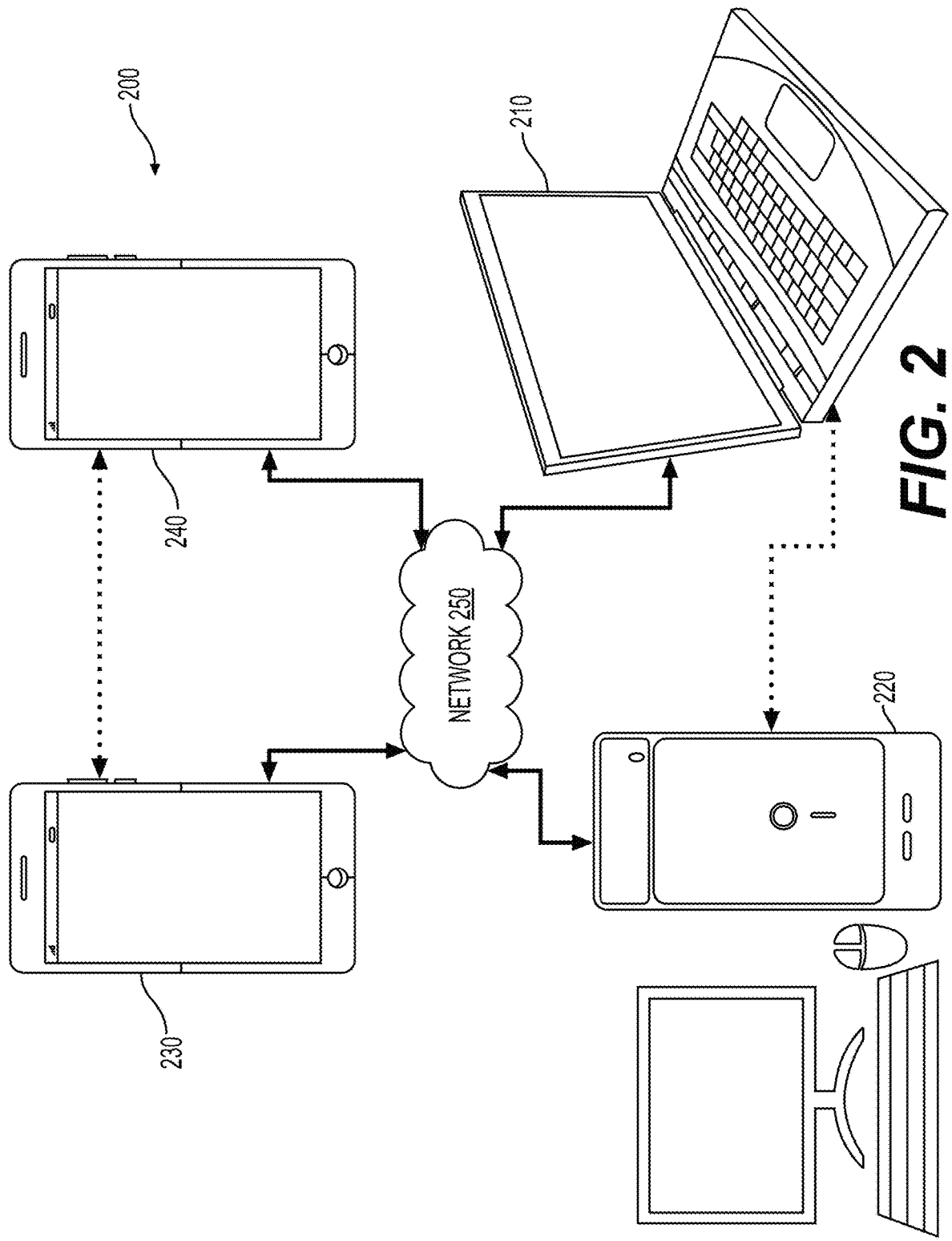
FIG. 2 is a schematic illustration of a simplified block diagram of a communication system in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
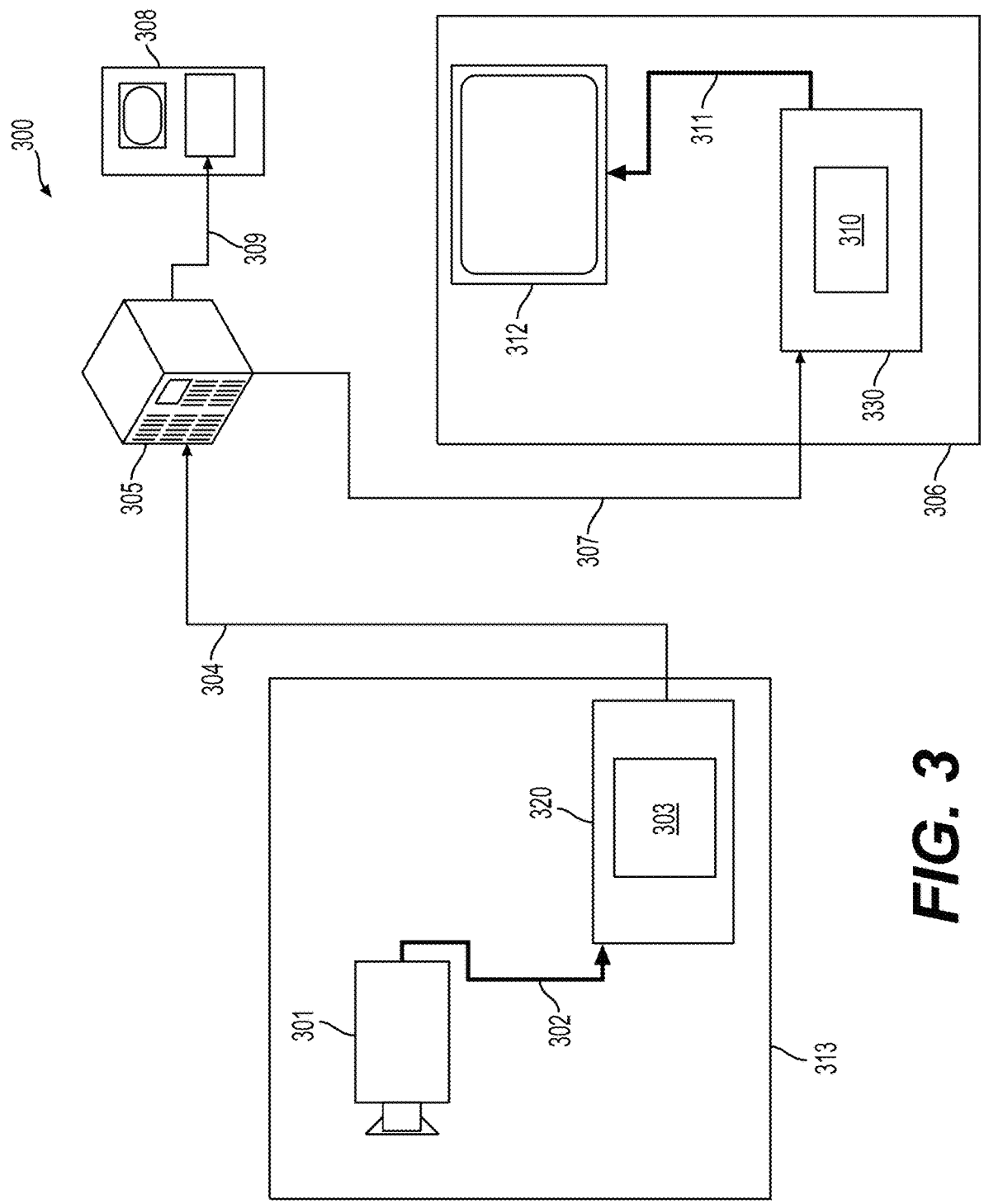
FIG. 3 is a schematic illustration of a simplified block diagram of a communication system in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313) that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
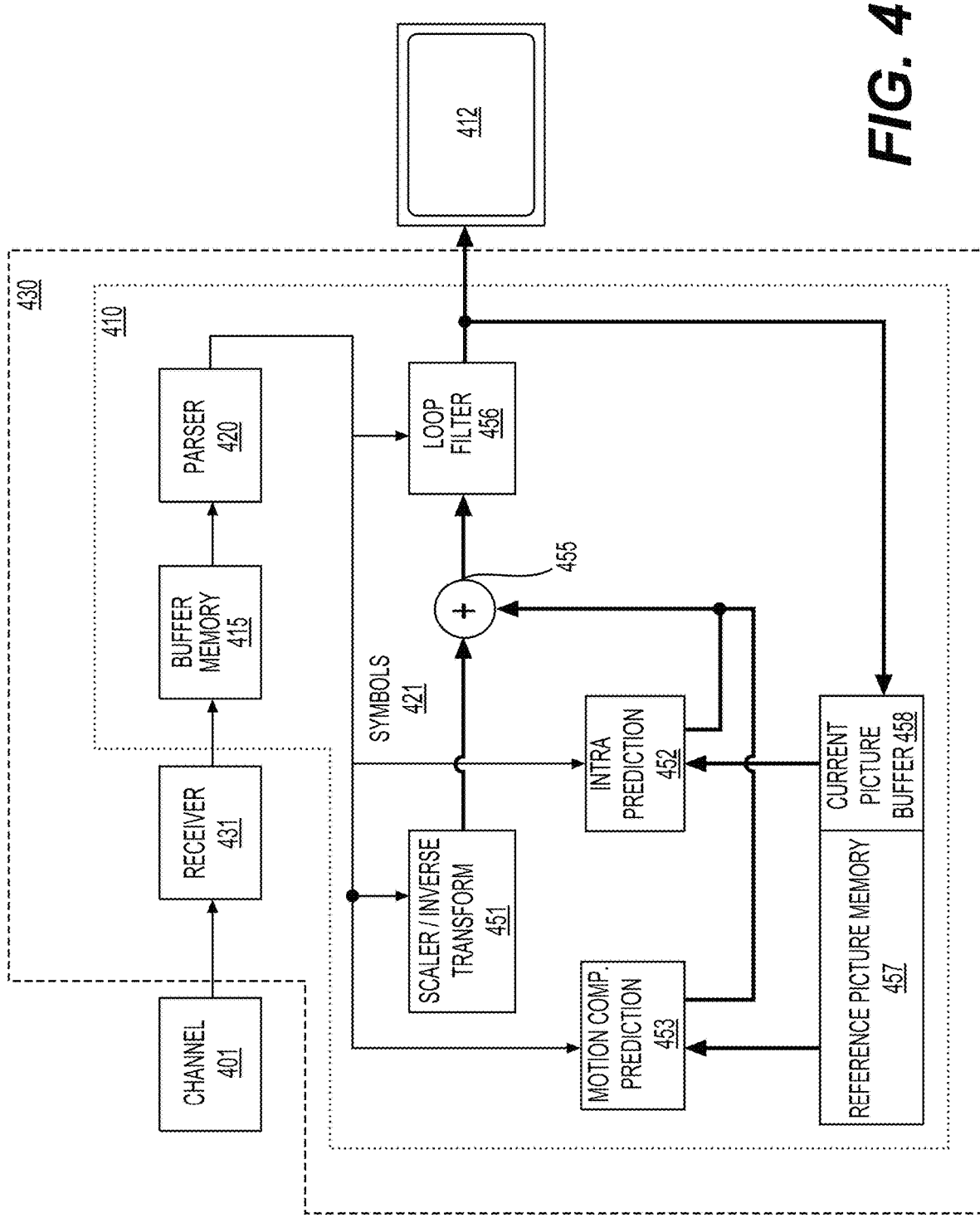
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, which can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
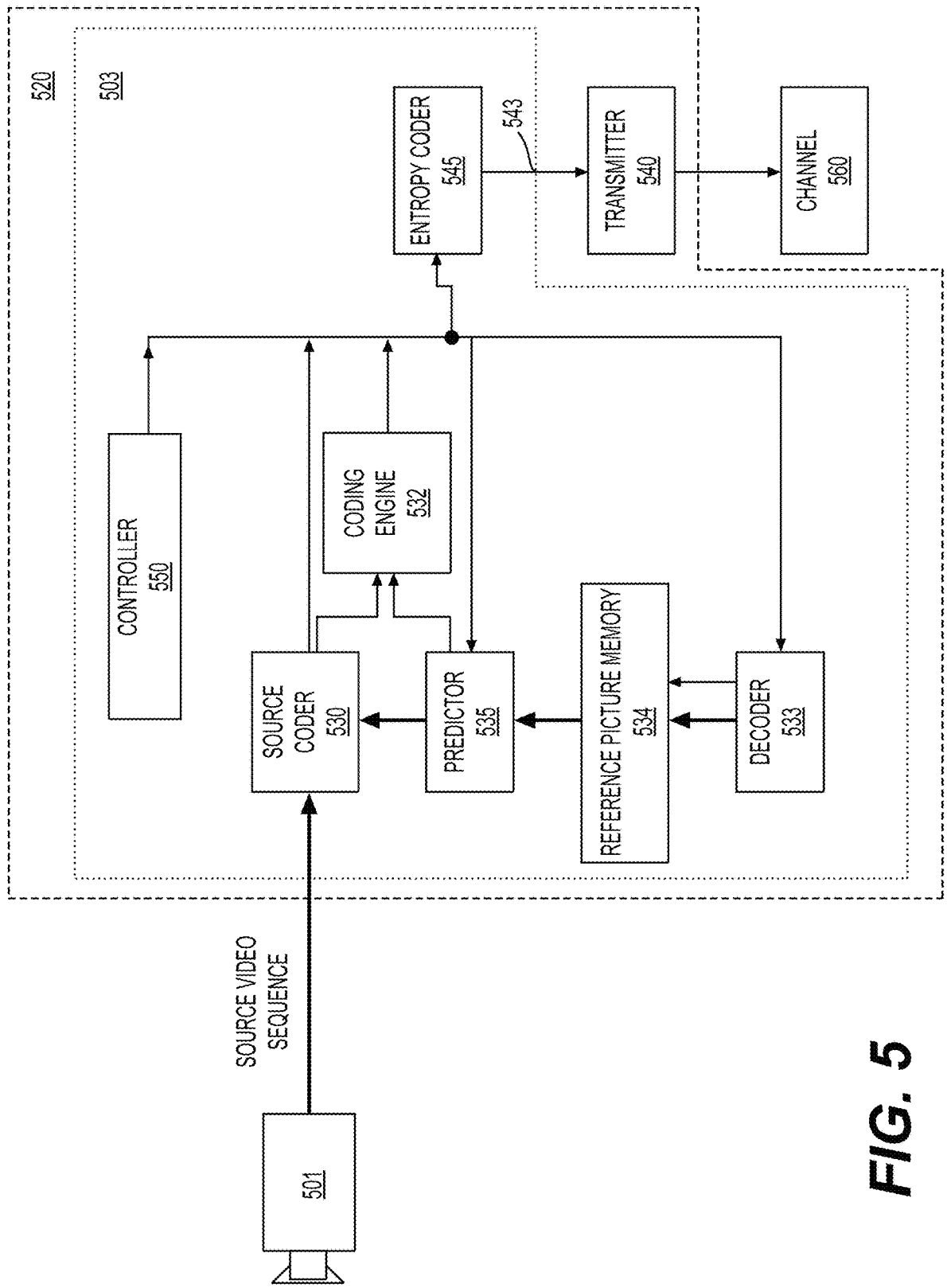
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop.

As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
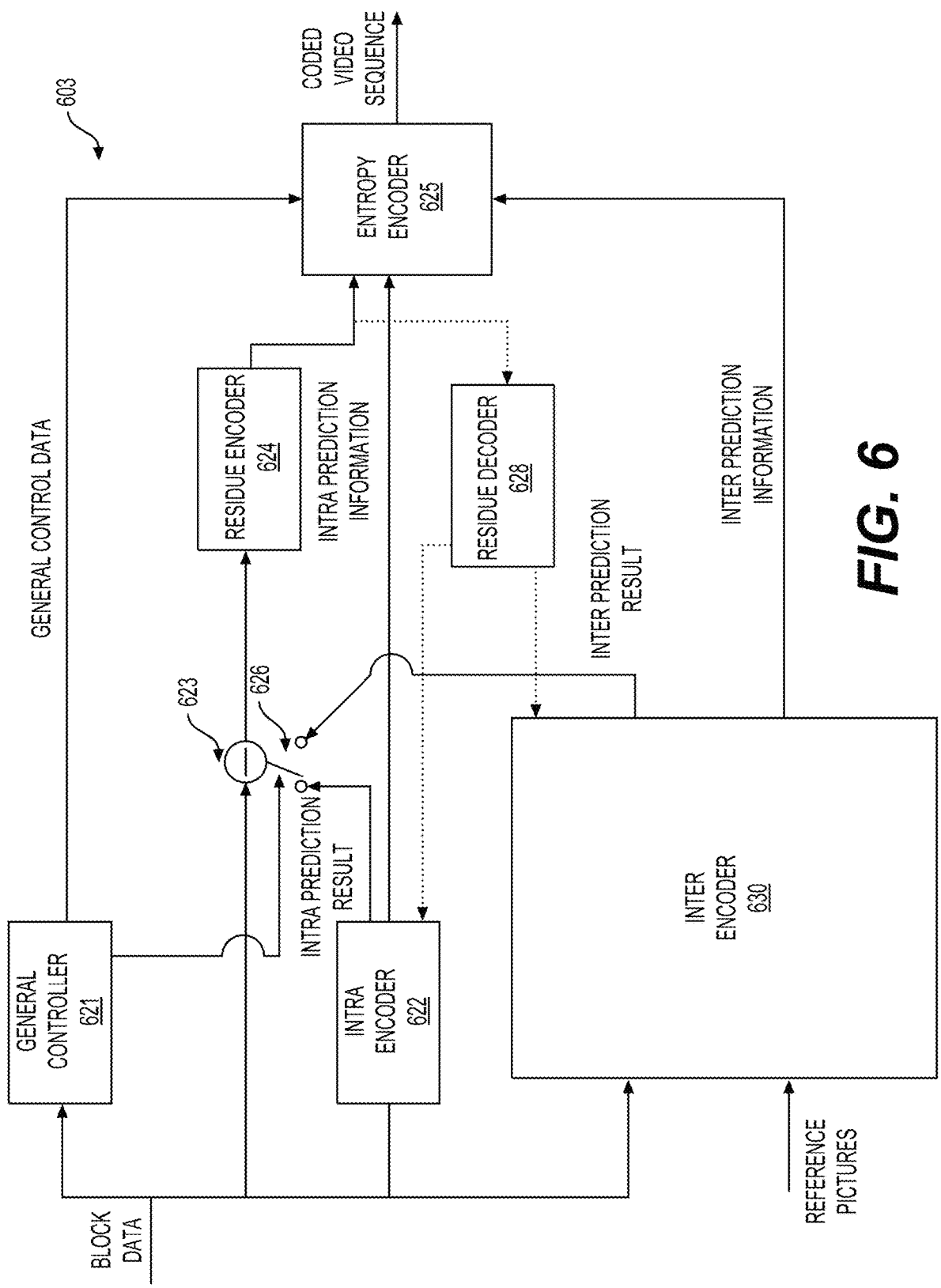
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
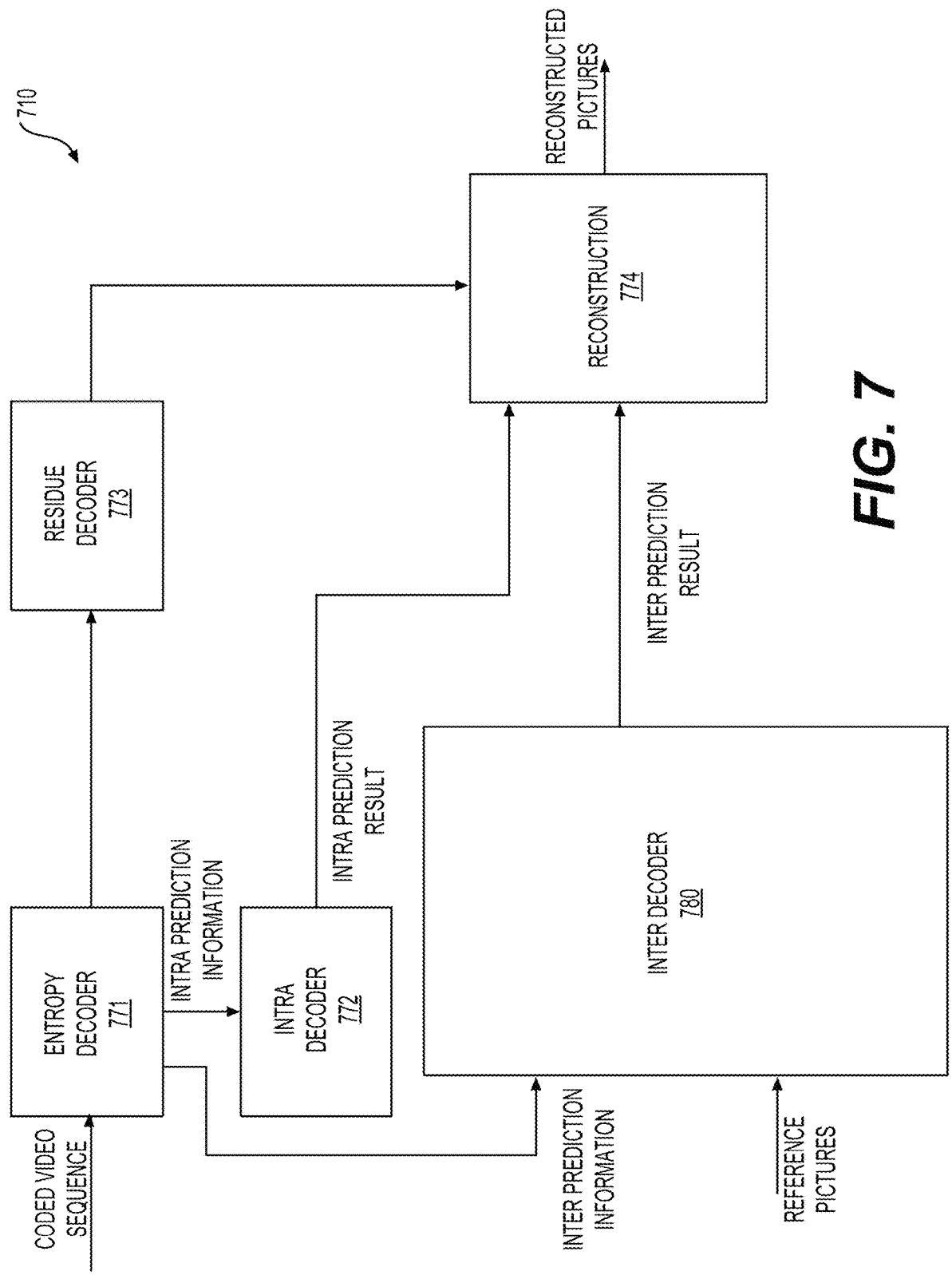
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information to include the Quantizer Parameter (QP), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

II. Transform Skip Mode

In an embodiment of the present disclosure, a transform skip (TS) mode can be applied for coding both intra and inter prediction residuals. For a luma or chroma coding block with less than or equal to 16 samples, a flag may be signaled to indicate whether the TS mode is applied for current block.

When the TS mode is applied, the prediction process is the same as the prediction process in the regular transform mode. In some examples, intra or inter prediction may be applied. For transform skipping TUs, a scaling process may be used so that transform skipping coefficients can have similar magnitudes as other transform coefficients. In an embodiment, a scaling-down process may be performed, and the scaling factor may be the same as the scaling associated with other transforms (versus standard floating point transform with norm 1) of the same size. Moreover, when the TS mode is applied, de-quantization and scaling are the same as the de-quantization and scaling in the regular transform mode. Deblocking, sample adaptive offset (SAO), and adaptive loop filtering (ALF) also are the same when the TS mode is applied, but a flag may be signaled to indicate whether transform is bypassed. Further, a flag may be signaled in the SPS to indicate whether the TS mode is enabled or not.

In an example, the related spec text of the TS mode in a VVC draft is described in Table 1 below:

TABLE 1

Residual coding syntax

| | Descriptor |
|---|---|
| residual_coding( x0, y0, log2TbWidth, log2TbHeight, cIdx ) {  | |
|   if( transform_skip_enabled_flag && ( cIdx != 0 \|\| cu_mts_flag[ x0 ][ y0 ] == 0 ) | |
|   && ( log2TbWidth <= 2 ) && ( log2TbHeight <= 2 ) ) | |
|     transform_skip_flag[ x0 ][ y0 ][ cIdx ] | ae(v) |
|   last_sig_coeff_x_prefix | ae(v) |
|   last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   log2SbSize = ( Min( log2TbWidth, log2TbHeight ) < 2 ? 1 : 2 ) | |
|   numSbCoeff = 1 << ( log2SbSize << 1 ) | |
|   lastScanPos = numSbCoeff | |
|   ...... | |

In Table 1, transform_skip_flag[x0][y0][cIdx] specifies whether a transform is applied to the associated transform block or not. When transform_skip_flag[x0][y0][cIdx] is equal to 1, it specifies that no transform is applied to the current transform block. When transform_skip_flag[x0][y0][cIdx] is equal to 0, it specifies that whether transform is applied to the current transform block depends on other syntax elements. When transform_skip_flag[x0][y0][cIdx] is not present, it is inferred to be equal to 0.

The array indices x0, y0 specify the location (x0, y0) of a top-left luma sample of a transform block relative to a top-left luma sample of a picture. The array index cIdx specifies an indicator for the color component. When the array index cIdx is equal to 0, the color component is luma. When the array index cIdx is equal to 1, the color component is Cb. When the array index cIdx is equal to 2, the color component is Cr.

Next, an example of the scaling and the transformation process is described below.

Inputs to the process are:

(a) a luma location (xTbY, yTbY) specifying a top-left sample of a current luma transform block relative to a top left luma sample of a current picture, (b) a variable cIdx specifying the color component of the current block, (c) a variable nTbW specifying the transform block width, and (d) a variable nTbH specifying the transform block height.

The output of this process may be the (nTbW)×(nTbH) array of residual samples resSamples[x][y] with x=0 ... nTbW−1, y=0 ... nTbH−1.

In the scaling process, a variable bitDepth is a bit depth of the current color component, a variable bdShift is a scaling shift factor, and a variable tsShift is a transform skip shift. The variables bitDepth, bdShift, and tsShift may be derived as follows:

$$bitDepth=(cIdx==0)?BitDepth_Y:BitDepth_C \quad (Eq. 1)$$

$$bdShift=Max(22-bitDepth, 0) \quad (Eq. 2)$$

$$tsShift=5+((Log2(nTbW)+Log2(nTbH))/2) \quad (Eq. 3)$$

The scaling process for transform coefficients may be invoked with the transform block location (xTbY, yTbY), the transform width nTbW and the transform height nTbH, the color component variable cIdx, and the bit depth of the current color component bitDepth as the inputs, and an (nTbW)×nTbH) array of scaled transform coefficients d as the output.

The (nTbW)×nTbH) array of residual samples r is the quantized coefficients and may be derived as follows:

If transform_skip_flag[xTbY][yTbY][cIdx] is equal to 1, the residual sample array values r[x][y] with with x=0 ... nTbW−1, y=0 ... nTbH−1 may be derived as follows:

$$r[x][y]=d[x][y]<<tsShift \quad (Eq. 4)$$

When transform_skip_flag[xTbY][yTbY][cIdx] is equal to 0, the transformation process for scaled transform coefficients may be invoked with the transform block location (xTbY, yTbY), the transform width nTbW and the transform height nTbH, the color component variable cIdx and the (nTbW)×(nTbH) array of scaled transform coefficients d as the inputs, and an (nTbW)×(nTbH) array of residual samples r as the output.

The residual samples resSamples[x][y] with x=0 ... nTbW−1, y=0 ... nTbH−1 can be derived as follows:

$$resSamples[x][y]=(r[x][y]+(1<<(bdShift-1)))>>bdShift \quad (Eq. 5)$$

III. Block Differential Pulse-code Modulation Mode

Block differential pulse-code modulation (BDPCM) is an intra-coding tool that uses a differential pulse-code modulation (DPCM) approach at the block level. A bdpcm_flag may be transmitted at the CU level whenever the CU is a luma intra coded CU having each dimension smaller or equal to 32. This flag indicates whether regular intra coding or DPCM is used and encoded using a single Context-based adaptive binary arithmetic coding (CABAC) context.

BDPCM may use the Median Edge Detector of LOCO-I (e.g., used in JPEG-LS). Specifically, for a current pixel X having pixel A as a left neighbor, pixel B as a top neighbor, and C as a top-left neighbor, the prediction of the current pixel X P(X) is determined by the following formula:

$$P(X) = \begin{cases} \min(A, B) & \text{if } C \geq \max(A, B) \\ \max(A, B) & \text{if } C \leq \min(A, B) \\ A + B - C & \text{otherwise} \end{cases} \quad (Eq. 6)$$

The pixel predictor uses unfiltered reference pixels when predicting from the top row and left column of the CU. The predictor then uses reconstructed pixels for the rest of the CU. Pixels are processed in a raster-scan order inside the CU. The prediction error may be quantized in the spatial domain, after rescaling, in a way identical to the transform skip quantizer. Each pixel can be reconstructed by adding the dequantized prediction error to the prediction. Thus, the reconstructed pixels can be used to predict the next pixels in the raster-scan order. Amplitude and signs of the quantized prediction error are encoded separately. A cbf_bdpcm_flag is coded. If cbf_bdpcm_flag is equal to 0, all amplitudes of the block are to be decoded as zero. If cbf_bdpcm_flag is equal to 1, all amplitudes of the block are encoded individually in a raster-scan order. In order to keep complexity low, the amplitude can be limited to at most 31 (inclusive). The amplitude may be encoded using unary binarization, with three contexts for the first bin, then one context for each additional bin until the 12th bin, and one context for all remaining bins. A sign may be encoded in bypass model for each zero residue.

In order to maintain the coherence of the regular intra mode prediction, the first mode in the most probable mode (MPM) list of the intra mode prediction is associated with a BDPCM CU (without being transmitted) and is available for generating the MPM for subsequent blocks.

The deblocking filter may be deactivated on a border/boundary between two BDPCM coded blocks because neither of the BDPCM coded blocks performs a transform, which is usually responsible for blocking artifacts. Further, BDPCM may not use any other step except the ones described here. In particular, BDPCM may not perform any transform in residual coding as described above.

Several tests regarding BDPCM have been conducted to investigate the throughput improvements of BDPCM and the interaction with other Screen Content Coding (SCC) tools.

Figure 8A:
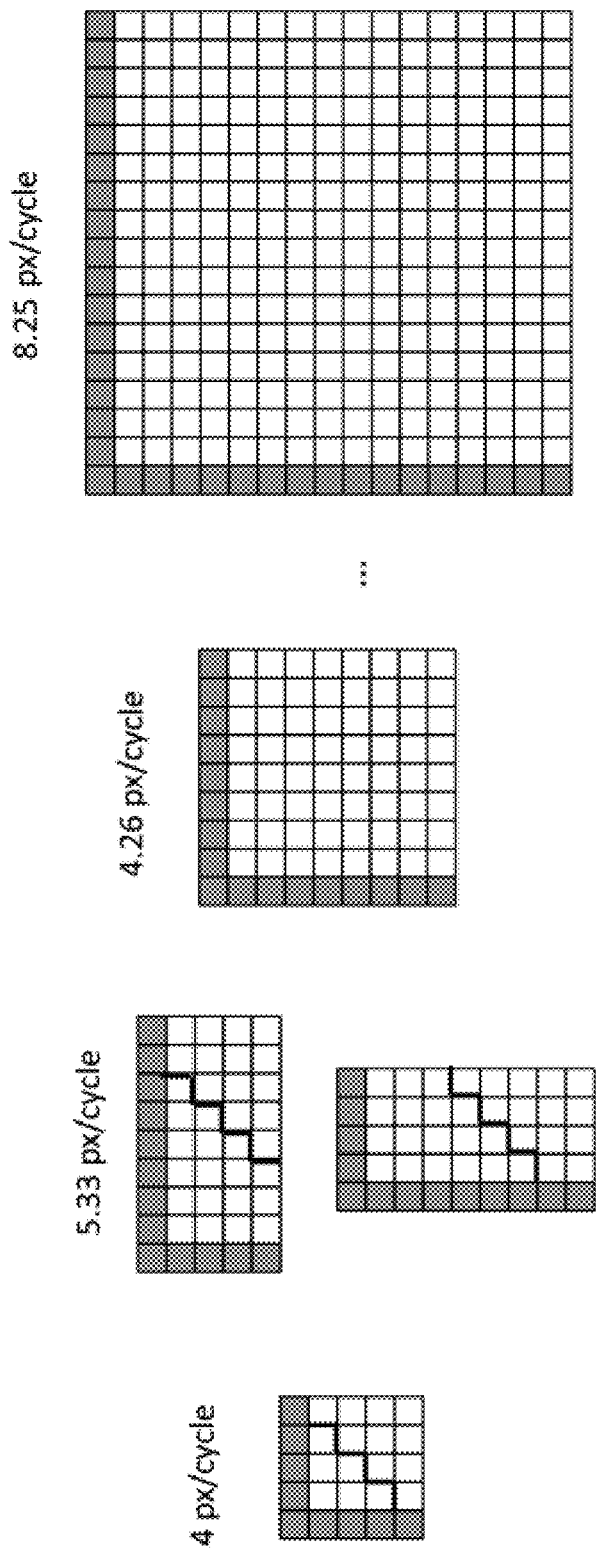
FIG. 8A shows examples of block differential pulse-code modulation (BDPCM) coded blocks in accordance with an embodiment.

FIG. 8A shows examples of BDPCM coded blocks according to an embodiment. The examples shown in FIG. 8A are related to Test 1. As shown in FIG. 8A, in order to increase throughput, smaller blocks (e.g., having sizes of 4×4, 4×8, and 8×4) may be divided into two independently decodable areas, using a diagonal which effectively divides the block into two halves (e.g., stair-case shaped partition).

In an embodiment, pixels from one area of a first half may not be allowed to use pixels from another area of a second half to compute the prediction. If pixels from one area need to use pixels from another area to compute the prediction, reference pixels are used instead. For example, the pixels from the other area may be replaced by the closest reference pixels. For example, a left neighbor may be replaced with a left reference pixel from the same row, a top neighbor may be replaced with a left reference pixel from the same column, and a top-left neighbor may be replaced with the closest reference pixel. Thus, the two areas can be processed in parallel.

FIG. 8A also provides an exemplary throughput of each block having a different size. For example, for a 4×4 block with two independently decodable areas, the throughput may be 4 pixels per cycle. For a 4×8 or 8×4 block with two independently decodable areas, the throughput may be 5.33 pixels per cycle. For an 8×8 block without independently decodable areas, the throughput may be 4.26 pixels per cycle. For an 8×8 block without independently decodable areas, the throughput may be 4.26 pixels per cycle. For a 16×16 block without independently decodable areas, the throughput may be 8.25 pixels per cycle.

Figure 8B:
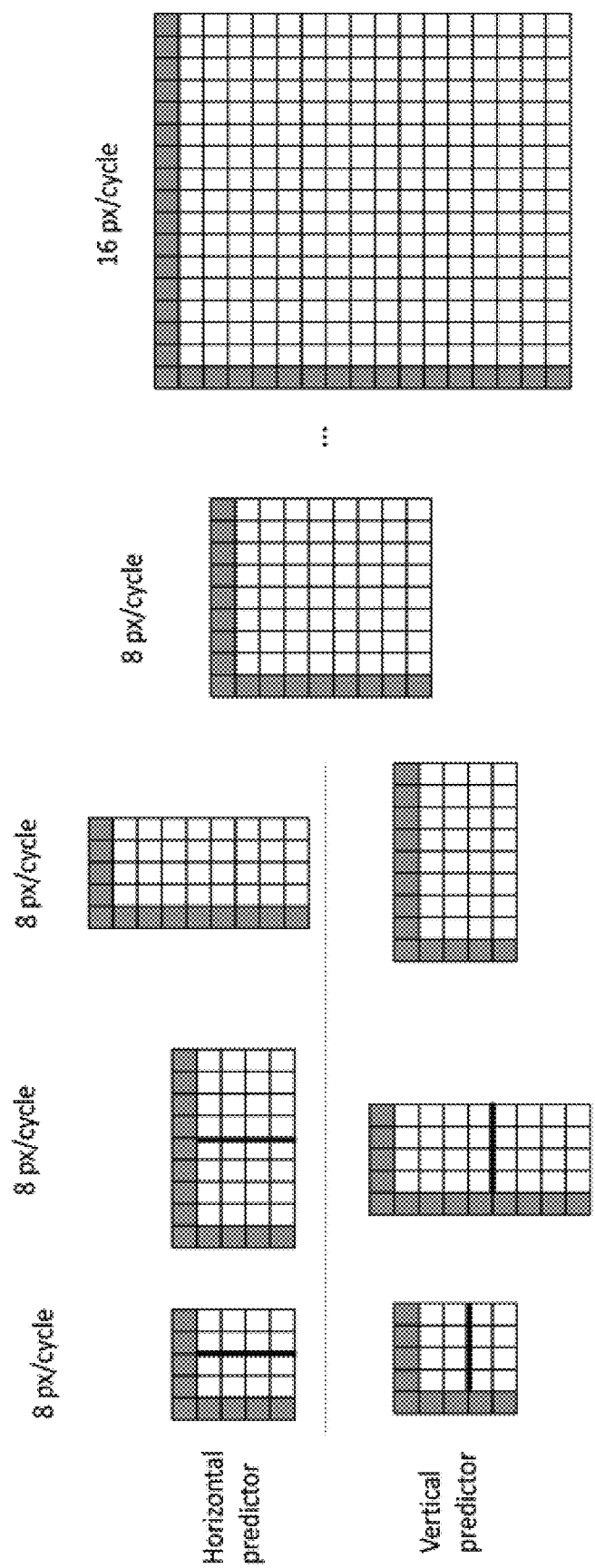
FIG. 8B shows examples of BDPCM coded blocks in accordance with an embodiment.

FIG. 8B shows examples of BDPCM coded blocks according to an embodiment. The examples shown in FIG. 8B are related to Test 2. In FIG. 8B, the block may be divided using a vertical or horizontal predictor to replace a JPEG-LS predictor. The vertical or horizontal predictor may be chosen and signaled at a block level. The shape of the independently decodable regions reflects the geometry of the predictor. Due to the shape of the horizontal or vertical predictors, which use a left or a top pixel for prediction of the current pixel, the most throughput-efficient way of processing the block may be to process all the pixels of one column or row in parallel, and to process these columns or rows sequentially. For example, in order to increase throughput, a block of width 4 is divided into two halves with a horizontal boundary when the predictor chosen on this block is vertical, and a block of height 4 is divided into two halves with a vertical boundary when the predictor chosen on this block is horizontal. For a 4×4 block, an 8×4, or a 4×8 block with two independently decodable areas, the throughput may be 8 pixels per cycle. For a 4×8 block, an 8×4 block, or an 8×8 block without independently decodable areas, the throughput may be 8 pixels per cycle. For a 16×16 block without independently decodable areas, the throughput may be 16 pixels per cycle.

In Test 3, according to an embodiment of the present disclosure, the BDPCM residue amplitude is limited to 28, and the amplitude is encoded with truncated unary binarization for the first 12 bins, followed by order-2 Exp-Golomb equal probability bins for the remainder (e.g., using an encodeRemAbsEP( )function).

IV. Transform Coefficient Coding

Entropy coding can be performed at a last stage of video coding (or a first stage of video decoding) after a video signal is reduced to a series of syntax elements. Entropy coding can be a lossless compression scheme that uses statistic properties to compress data such that a number of bits used to represent the data are logarithmically proportional to the probability of the data. For example, by performing entropy coding over a set of syntax elements, bits representing the syntax elements (referred to as bins) can be converted to fewer bits (referred to as coded bits) in a bit stream. CABAC is one form of entropy coding. In CABAC, a context model providing a probability estimate can be determined for each bin in a sequence of bins based on a context associated with the respective bin. Subsequently, a binary arithmetic coding process can be performed using the probability estimates to encode the sequence of bins to coded bits in a bit stream. In addition, the context model is updated with a new probability estimate based on the coded bin.

Figure 9A:
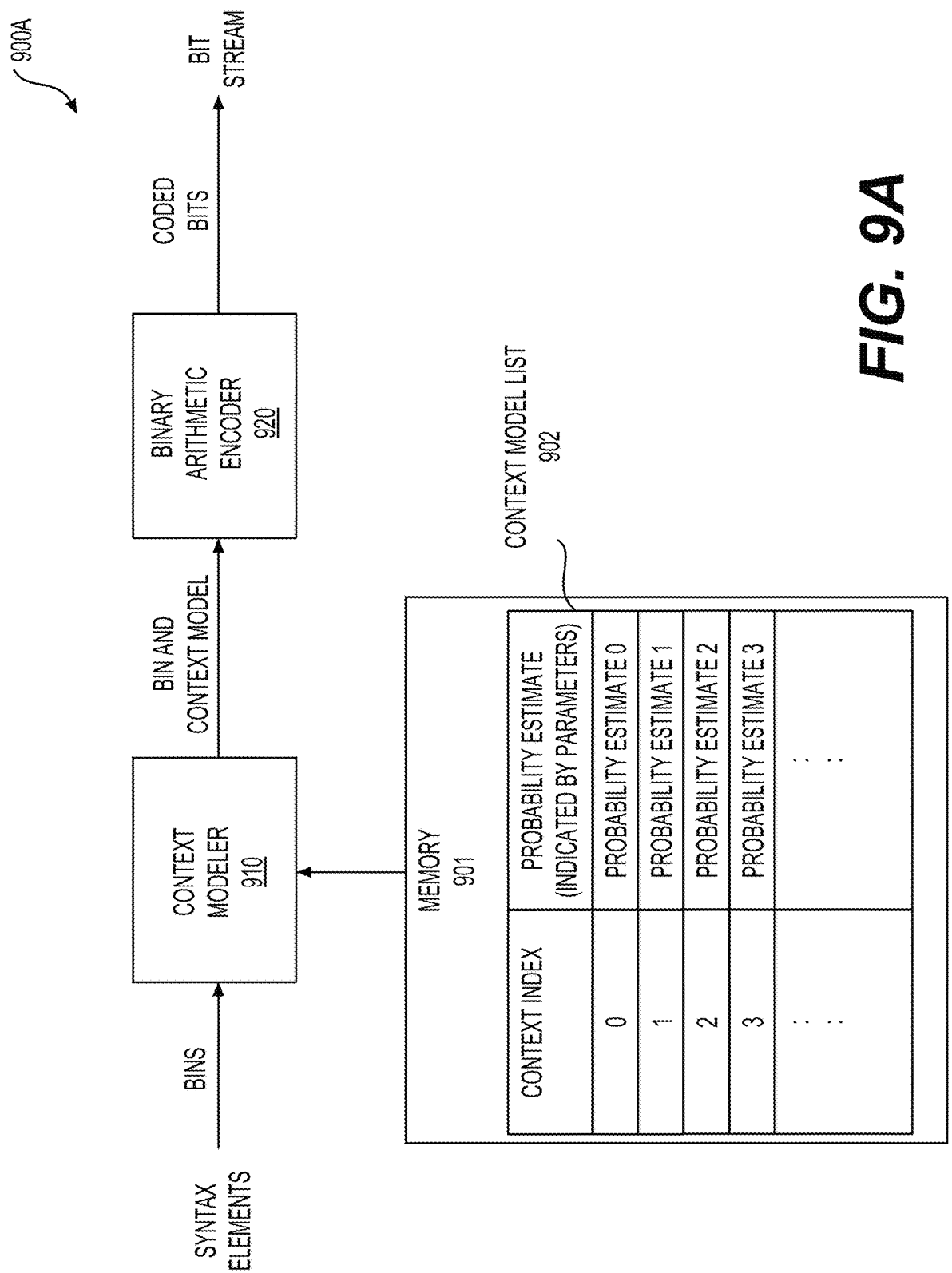
FIG. 9A shows an exemplary context-based adaptive binary arithmetic coding (CABAC) based entropy encoder in accordance with an embodiment.

FIG. 9A shows an exemplary CABAC based entropy encoder (900A) in accordance with an embodiment. For example, the entropy encoder (900A) can be implemented in the entropy coder (545) in the FIG. 5 example, or the entropy encoder (625) in the FIG. 6 example. The entropy encoder (900A) can include a context modeler (910) and a binary arithmetic encoder (920). In an example, various types of syntax elements are provided as input to the entropy encoder (900A). For example, a bin of a binary valued syntax element can be directly input to the context modeler (910), while a non-binary valued syntax element can be binarized to a bin string before bins of the bin string are input to the context modeler (910).

In an example, the context modeler (910) receives bins of syntax elements, and performs a context modeling process to select a context model for each received bin. For example, a bin of a binary syntax element of a transform coefficient in a transform block is received. The transform block may be a transform skipped block when the current block is coded with BDPCM for prediction. A context model can accordingly be determined for this bin based, for example, on a type of the syntax element, a color component type of the transform component, a location of the transform coefficient, and previously processed neighboring transform coefficients, and the like. The context model can provide a probability estimate for this bin.

In an example, a set of context models can be configured for one or more types of syntax elements. Those context models can be arranged in a context model list (902) that is stored in a memory (901) as shown in FIG. 9A. Each entry in the context model list (902) can represent a context model. Each context model in the list can be assigned an index, referred to as a context model index, or context index. In addition, each context model can include a probability estimate, or parameters indicating a probability estimate. The probability estimate can indicate a likelihood of a bin being 0 or 1. For example, during the context modeling, the context modeler (910) can calculate a context index for a bin, and a context model can accordingly be selected according to the context index from the context model list (902) and assigned to the bin.

Moreover, probability estimates in the context model list can be initialized at the start of the operation of the entropy encoder (900A). After a context model in the context model list (902) is assigned to a bin and used for encoding the bin, the context model can subsequently be updated according to a value of the bin with an updated probability estimate.

In an example, the binary arithmetic encoder (920) receives bins and context models (e.g., probability estimates) assigned to the bins, and accordingly performs a binary arithmetic coding process. As a result, coded bits are generated and transmitted in a bit stream.

Figure 9B:
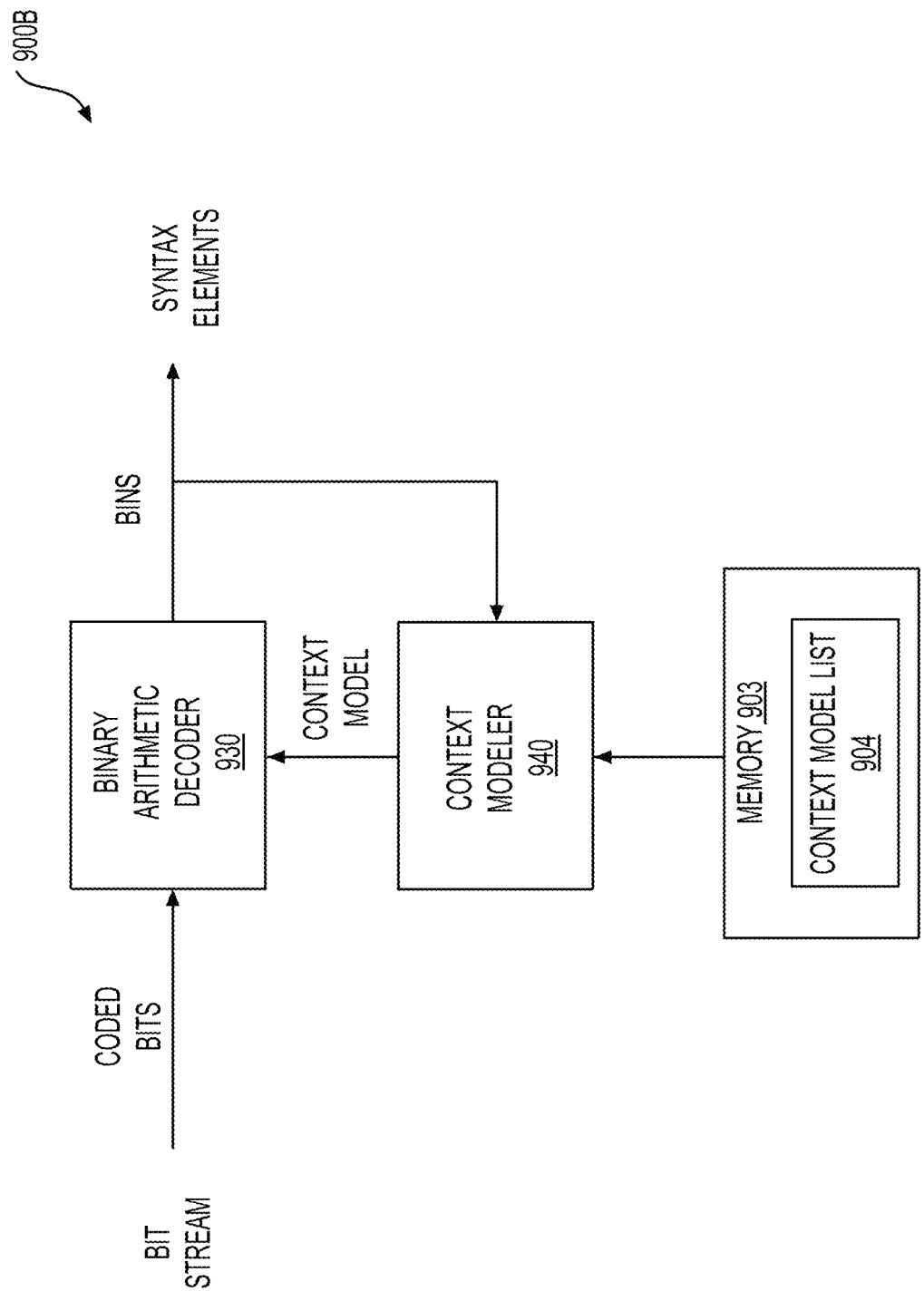
FIG. 9B shows an exemplary CABAC based entropy decoder in accordance with an embodiment.

FIG. 9B shows an exemplary CABAC based entropy decoder (900B) in accordance with an embodiment. For example, the entropy decoder (900B) can be implemented in the parser (420) in the FIG. 4 example, or the entropy decoder (771) in the FIG. 7 example. The entropy decoder (900B) can include a binary arithmetic decoder (930), and a context modeler (940). The binary arithmetic decoder (930) receives coded bits from a bit stream, and performs a binary arithmetic decoding process to recover bins from the coded bits. The context modeler (940) can operate similarly to the context modeler (910). For example, the context modeler (940) can select context models in a context model list (904) stored in a memory (903), and provide the selected context models to the binary arithmetic decoder (930). The context modeler (940) can determine the context models based on the recovered bins from the binary arithmetic decoder (930). For example, based on the recovered bins, the context modeler (940) can know a type of a syntax element of a next to-be-decoded bin, and values of previously decoded syntax elements. That information is used for determining a context model for the next to-be-decoded bin.

V. Entropy Coding for Transform Coefficients

1. Syntax Elements of Transform Coefficients

In an embodiment, residual signals of a transform block are first transformed from spatial domain to frequency domain resulting in a block of transform coefficients. Then, a quantization is performed to quantize the block of transform coefficients into a block of transform coefficient levels. In various embodiments, different techniques may be used for converting residual signals into transform coefficient levels. The block of transform coefficient levels is further processed to generate syntax elements that can be provided to an entropy encoder and encoded into bits of a bit stream. In an embodiment, a process of generating the syntax elements from the transform coefficient levels can be performed in the following way.

Figure 10:
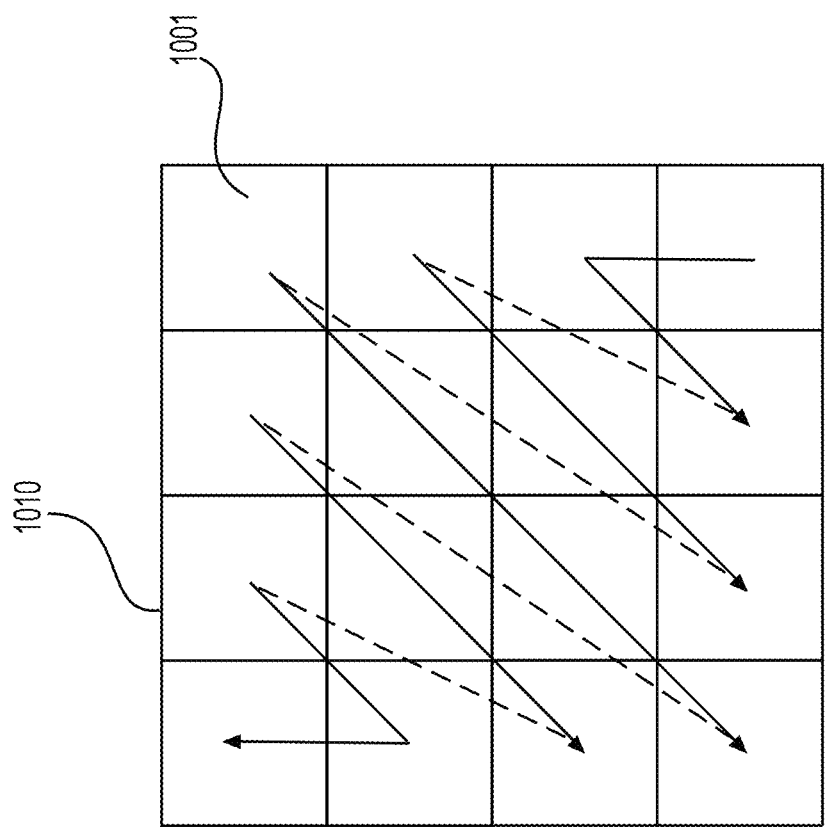
FIG. 10 shows an example of a sub-block scan order in accordance with an embodiment.

The block of transform coefficient levels can be first split into sub-blocks, for example, with a size of 4×4 positions. Those sub-blocks can be processed according to a pre-defined scan order. FIG. 10 shows an example of the sub-block scan order, referred to as an inverse diagonal scan order. As shown, a block (1010) is partitioned into sixteen sub-blocks (1001). Each sub-block (1001) may be a coefficient group (CG). Before a position in the sub-block (1001) is processed or scanned, a flag may be signaled to indicate whether the CG includes at least one non-zero transform coefficient level. When the flag indicates the CG includes at least one non-zero transform coefficient level, the sub-block at the bottom-right corner is first processed, and the sub-block at the top-left corner is last processed. For a sub-block within which the transform coefficient levels are all zero, the sub-block can be skipped without processing in an example. In a TS mode, the scan order may be the opposite of the inverse diagonal scan order. That is, the sub-block at the top-left corner may be first processed, and the sub-block at the bottom-right corner may be last processed.

Figure 11:
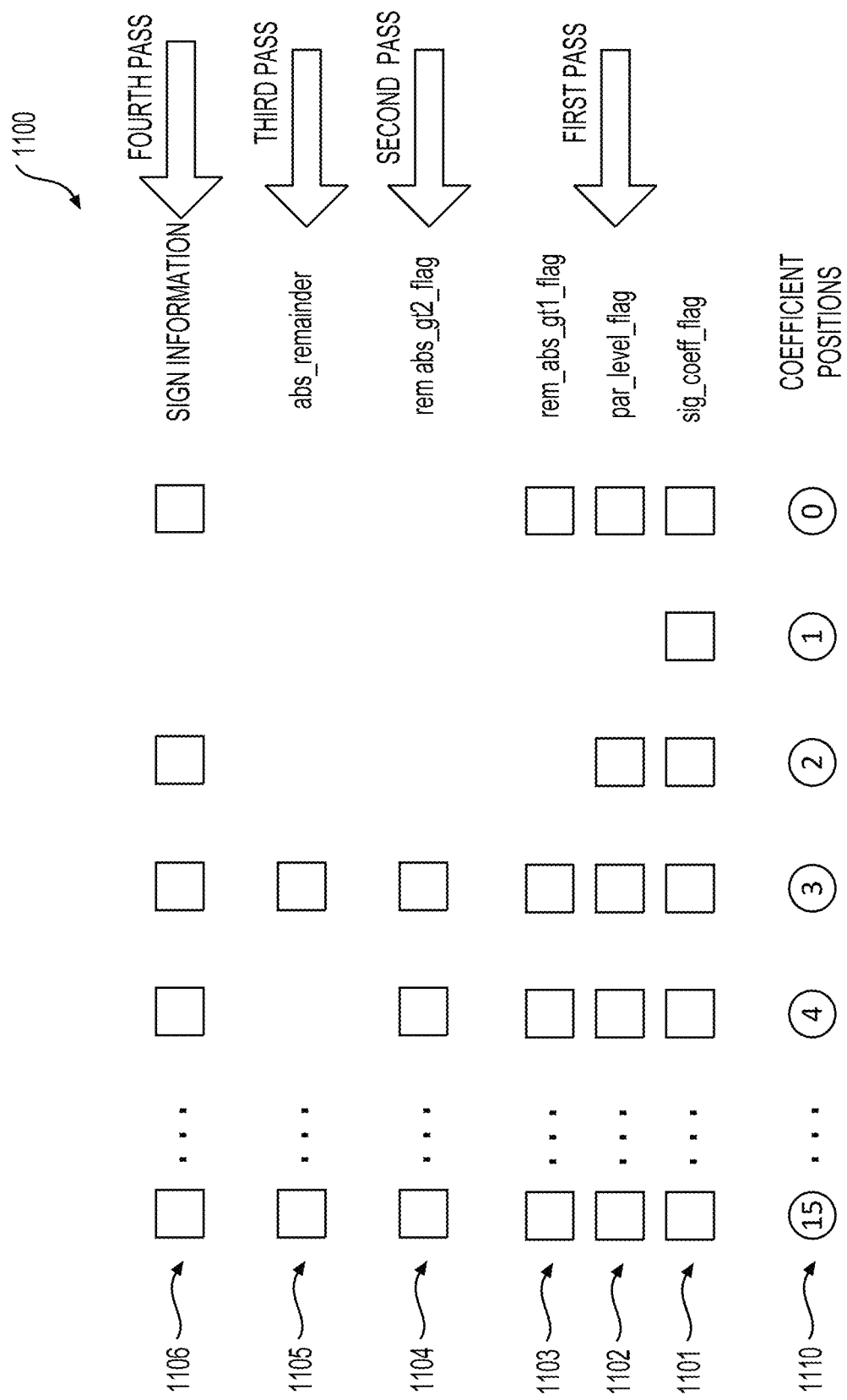
FIG. 11 shows an example of a sub-block scanning process from which different types of syntax elements of transform coefficients are generated in accordance with an embodiment.

For sub-blocks each having at least one non-zero transform coefficient level, four passes of a scan can be performed in each sub-block. During each pass, the 16 positions in the respective sub-block can be scanned in the inverse diagonal scan order. FIG. 11 shows an example of a sub-block scanning process (1100) from which different types of syntax elements of transform coefficients can be generated.

Sixteen coefficient positions (1110) inside a sub-block are shown in one dimension at the bottom of FIG. 11. The positions (1110) are numbered from 0 to 15 reflecting the respective scan order. During a first pass, the scan positions (1110) are scanned over, and three types of syntax elements (1101-1103) may be generated at each scan position (1110) as follows:

(i) A first type of binary syntax elements (1101) (referred to as significance flags and denoted by sig_coeff_flag) indicating whether an absolute transform coefficient level (hereinafter referred to as "absLevel") of the respective transform coefficient is zero or larger than zero. The absolute transform coefficient level generally refers to the magnitude of the transform coefficient value. The absolute transform coefficient level combined with a sign value (positive or negative) can represent the transform coefficient.

(ii) A second type of binary syntax elements (1102) (referred to as parity flags and denoted by par_level_flag) indicating a parity of the absolute transform coefficient level of the respective transform coefficient. The parity flags are generated only when the absolute transform coefficient level of the respective transform coefficient is non-zero.

(iii) A third type of binary syntax elements (1103) (referred to as greater than 1 flags and denoted by rem_abs_gt1_flag) indicating whether (absLevel−1)>>1 is greater than 0 for the respective transform coefficient. The greater than 1 flags are generated only when the absolute transform coefficient level of the respective transform coefficient is non-zero.

During a second pass, a fourth type of binary syntax elements (1104) may be generated. The fourth type of syntax elements (1104) is referred to as greater than 2 flags and denoted by rem_abs_gt2_flag. The fourth type of syntax elements (1104) indicates whether the absolute transform coefficient level of the respective transform coefficient is greater than 4. The greater than 2 flags are generated only when (absLevel−1)>>1 is greater than 0 for the respective transform coefficient.

During a third pass, a fifth type of non-binary syntax elements (1105) can possibly be generated. A remainder generally refers to a remaining value of the absolute transform coefficient level absLevel (e.g., abs_remainder). In coefficient coding, at least a first signal is generated to indicate whether the coefficient level is greater than a predetermined value X. Subsequently, a second signal is generated corresponding to the remainder value of the absolute transform coefficient level (e.g., absLevel-X). For example, here, the fifth type of syntax elements (1105) may be denoted by abs_remainder, and indicates a remaining value of the absolute transform coefficient level of the respective transform coefficient that is greater than 4. The fifth type of syntax elements (1105) are generated only when the absolute transform coefficient level of the respective transform coefficient is greater than 4.

During a fourth pass, a sixth type of syntax elements (1106) can be generated at each scan position (1110) with a non-zero coefficient level indicating a sign of the respective transform coefficient level.

In a TS mode, the first pass may include the significance flags, the parity flags, the greater than 1 flags, and the greater than 2 flags. Moreover, additional types of syntax elements such as greater than x flags may be generated during a separate pass. The greater than x flags may be denoted by rem_abs_gtx_flag and indicate whether the absolute transform coefficient level of the respective transform coefficient is greater than x. In some examples, x can be 2, 4, 6, or 8.

The above described various types of syntax elements can be provided to an entropy encoder according to the order of the passes and the scan order in each pass. Different entropy encoding schemes can be employed for encoding different types of syntax elements. For example, in an embodiment, the significance flags, parity flags, greater than 1 flags, and greater than 2 flags can be encoded with a CABAC based entropy encoder, as described in FIG. 9A. In contrast, the syntax elements generated during the third and fourth passes can be encoded with a CABAC-bypassed entropy encoder (e.g., a binary arithmetic encoder with fixed probability estimates for input bins).

2. Context Modeling of Bins of Transform Coefficient Syntax Elements

Context modeling can be performed to determine context models for bins of some types of transform coefficient syntax elements. In an embodiment, in order to exploit the correlation among the transform coefficients, the context models can be determined according to a local template and a diagonal position of each current coefficient (e.g., a coefficient currently under processing) possibly in combination with other factors.

Figure 12:
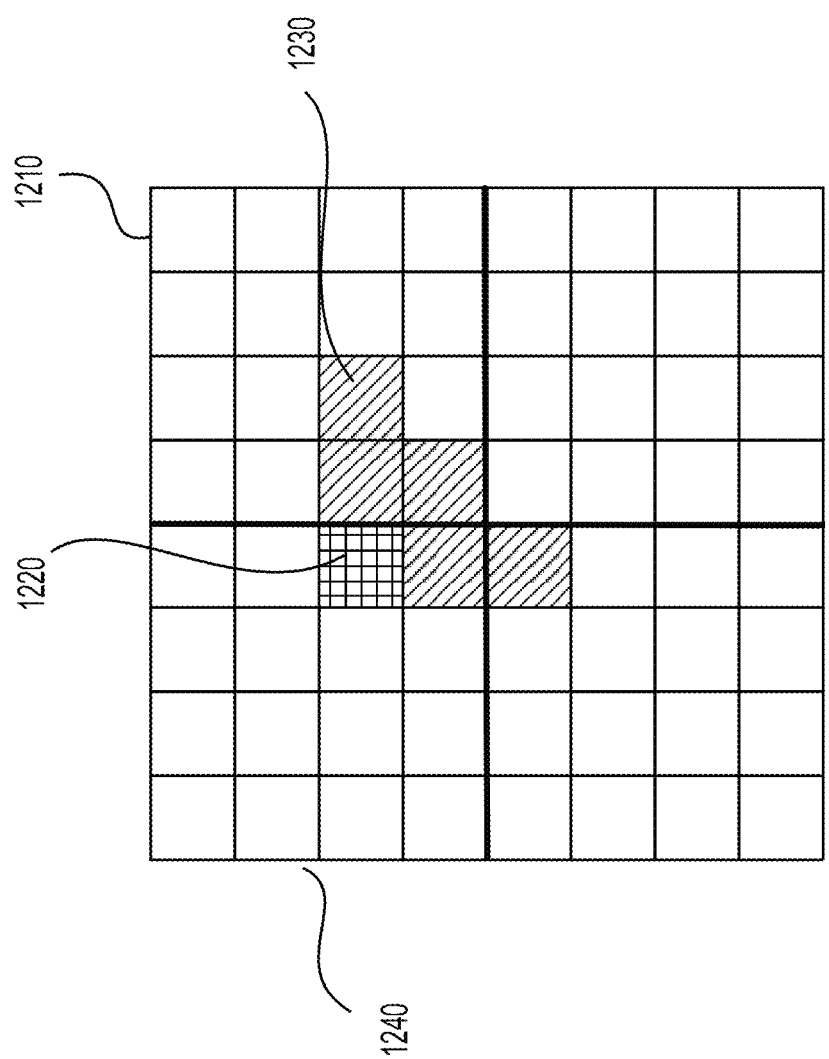
FIG. 12 shows an example of a local template used for context selection for current coefficients in accordance with an embodiment.

FIG. 12 shows an example of a local template (1230) used for context selection for current coefficients. The local template (1230) can cover a set of neighboring positions or coefficients of a current coefficient (1220) in a coefficient block (1210). The coefficient block (1210) can have a size of 8×8 positions, and include coefficient levels at the 64 positions. The coefficient block (1210) is partitioned into 4 sub-blocks each with a size of 4×4 positions. Each sub-block may be a CG that can include 4×4 coefficient positions. The CG (1230) includes the current coefficient (1210). A flag may be signaled to indicate whether the CG (1230) includes only zero coefficient levels. In the FIG. 12 example, the local template (1230) is defined to be a 5 position template covering 5 coefficient levels at the bottom-right side of the current coefficient (1220). When an inverse diagonal scan order is used for multiple passes over the scan positions within the coefficient block (1210), the neighboring positions within the local template (1230) are processed prior to the current coefficient (1220). In a TS mode, the scan order may be the opposite of the inverse diagonal scan order and the local template may be a 5 position template cover 5 coefficient levels at the top-left side of the current coefficient.

During the context modeling, information of the coefficient levels within the local template (1230) can be used to determine a context model. For this purpose, a measure, referred to as a template magnitude, is defined in some embodiments to measure or indicate magnitudes of the transform coefficients or transform coefficient levels within the local template (1230). The template magnitude can then be used as the basis for selecting the context model.

In one example, the template magnitude is defined to be a sum, denoted by sumAbs1, of partially reconstructed absolute transform coefficient levels inside the local template (1230). A partially reconstructed absolute transform coefficient level can be determined according to bins of the syntax elements, sig_coeff_flag, par_level_flag, and rem_abs_gt1_flag of the respective transform coefficient. Those three types of syntax elements may be obtained after a first pass over scan positions of a sub-block performed in an entropy encoder or an entropy decoder. In an embodiment, numSig is a number of non-zero coefficients in the local template (1230). Moreover, a diagonal position of a scan position (x, y) d is defined according to: d=x+y, where x and y are coordinates of the respective position. The context model index may be selected based on sumAbs1 and the diagonal position d as described below.

3. Context Index Determination Based on Local Template and Diagonal Position

In an embodiment, during a context modeling process in an entropy encoder or decoder, context indices can be determined as described below for the context coded binary syntax elements of the current coefficient (1220). The determination can be based on the local template (1230) and the diagonal position of the current coefficient (1220).

(1) sig_coeff_flag

When coding sig_coeff_flag of the current coefficient (1220), the context index can be selected depending on sumAbs1 and diagonal position d of the current coefficient (1220). For example, for luma component, the context index is determined according to:

$$ctxSig = 18*\max(0, state-1) + \min(sumAbs1, 5) + (d<2?12:(d<5?6:0)) \quad (Eq. 7)$$

where ctxSig represents the context index of the significance flag syntax element, and "state" specifies a state of a scaler quantizer of a dependent quantization scheme where the state can have a value of 0, 1, 2, or 3.

The Eq. 7 is equivalent to the following formulas:

$$ctxIdBase = 18*\max(0, state-1) + (d<2?12:(d<5?6:0)), \quad (Eq. 8)$$

$$ctxSig = ctxIdSigTable[\min(sumAbs1, 5)] + ctxIdBase. \quad (Eq. 9)$$

In Eq. 8 and Eq. 9, ctxIdBase represents a context index base. The context index base can be determined based on the state and the diagonal position d. For example, the state can have a value of 0, 1, 2, or 3, and accordingly max(0, state-1) can have one of three possible values, 0, 1, or 2. For example, (d<2? 12: (d<5? 6: 0)) can take a value of 12, 6, or 0, corresponding to different ranges of d: d<2, 2<=d<5, or 5<=d.

In Eq. 8 and Eq. 9, ctxIdSigTable[ ] can represent an array data structure, and can store context index offsets of significance flags with respect to the ctxIdBase. For example, for different sumAbs1 values, min(sumAbs1, 5) clips a sumAbs1 value to be smaller than or equal to 5. Then, the clipped value is mapped to a context index offset. For example, under the definition of ctxIdSigTable[0~5]={0, 1, 2, 3, 4, 5}, the clipped value 0, 1, 2, 3, 4, or 5 are mapped to 0, 1, 2, 3, 4, or 5, respectively.

For chroma component, the context index can be determined according to:

$$ctxSig = 12 * \max(0, state-1) + \min(sumAbs1, 5) + (d<2?6:0), \quad \text{(Eq. 10)}$$

which is equivalent to the following formulas:

$$ctxIdBase = 12 * \max(0, state-1) + (d<2?6:0), \quad \text{(Eq. 11)}$$

$$ctxSig = ctxIdSigTable[\min(sumAbs1, 5)] + ctxIdBase. \quad \text{(Eq. 12)}$$

(2) par_level_flag

When coding par_level_flag of the current coefficient (1220), the context index can be selected depending on sumAbs1, numSig, and diagonal position d. For example, for luma component, if the current coefficient is the first non-zero coefficient in decoding order, the context index ctxPar is assigned to be 0; otherwise the context index can be determined according to:

$$ctxPar = 1 + \min(sumAbs1 - numSig, 4) + (d==0?15:(d<3?10:(d<10?5:0))), \quad \text{(Eq. 13)}$$

which is equivalent to the following formulas:

$$ctxIdBase = (d==0?15:(d<3?10:(d<10?5:0))), \quad \text{(Eq. 14)}$$

$$ctxPar = 1 + ctxIdTable[\min(sumAbs1 - numSig, 4)] + ctxIdBase, \quad \text{(Eq. 15)}$$

where ctxPar represents the context index of the parity flag, and ctxIdTable[ ] represents another array data structure, and stores context index offsets with respect to the respective ctxIdBase. For example, ctxIdTable[0~4]={0, 1, 2, 3, 4}.

For chroma, if the current coefficient is the first non-zero coefficient in decoding order, the context index ctxPar is assigned to be 0; otherwise, the context index can be determined according to:

$$ctxPar = 1 + \min(sumAbs1 - numSig, 4) + (d==0?5:0), \quad \text{(Eq. 16)}$$

which is equivalent to the following formulas:

$$ctxIdBase = (d==0?5:0), \quad \text{(Eq. 17)}$$

$$ctxPar = 1 + ctxIdTable[\min(sumAbs1 - numSig, 4)] + ctxIdBase. \quad \text{(Eq. 18)}$$

(3) rem_abs_gt1_flag and rem_abs_gt2_flag

When coding rem_abs_gt1_flag and rem_abs_gt2_flag of the current coefficient (1220), the context model indices can be determined in the same way as par_level_flag:

$$ctxGt1 = ctxPar,$$

$$ctxGt2 = ctxPar,$$

where ctxGt1 and ctxGt2 represent the context indices of the greater than 1 and greater than 2 flags, respectively.

It is noted that different sets of context models are used for different types of the syntax elements, sig_coeff_flag, par_level_flag, rem_abs_gt1_flag and rem_abs_gt2_flag. For example, the context model used for rem_abs_gt1_flag is different from that of rem_abs_gt2_flag, even though a value of ctxGt1 is equal to that of ctxGt2.

VI. Improved Residual Coding for the TS mode and the BDPCM mode

The residual coding for both the TS mode and the BDPCM mode is processed in the spatial domain without transform. Therefore, a shared module between the TS mode and the BDPCM mode can be used for a simpler design of coefficient coding.

Moreover, the coefficients of the TS mode and the BDPCM mode show different characteristics from regular transform coefficients which are associated with transform and quantization. Therefore, a different coefficient coding scheme may show better coding performance.

In an embodiment, for coefficient coding of the TS mode and/or the BDPCM mode, the parity bit flag (e.g., par_level_flag) which indicates the parity of the absolute transform coefficient level (e.g., absLevel) may be bypass coded without using context modeling in arithmetic coding. In an example, the parity bit flag can be coded in a separate pass. In another example, the parity bit flag can be coded together with abs_remainder in a same pass.

In an embodiment, for coefficient coding of the TS mode and/or the BDPCM mode, the parity bit flag (e.g., par_level_flag) which indicates the parity of the absolute transform coefficient level (e.g., absLevel) may be coded in a separate pass or coded together with other syntax elements in one pass with a certain order or combination. In an example, the parity bit flag can be coded in a separate pass after the coding pass which codes sig_coeff_flag and rem_abs_gt1_flag. In another example, the parity bit flag can be coded in a separate pass after the coding pass which codes rem_abs_gt2_flag or a greater than x flag (e.g., rem_abs_gtx_flag), where x can be 2, 4, 6, or 8. In an example, the parity bit flag can be coded together with rem_abs_gt2_flag or the greater than x flag in a same coding pass. In an example, the parity bit flag can be coded together with sign information in a same coding pass.

In an embodiment, for coefficient coding of the TS mode and/or the BDPCM mode, when coding the syntax element rem_abs_gt2_flag, the number of context coded bins per coefficient for coding rem_abs_gt2_flag may depend on coded information. The coded information may include the number of nonzero coefficients (e.g., number of coded sig_coeff_flag in the current CG), the number of nonzero coefficients (e.g., number of coded sig_coeff_flag) in the previously coded CG, whether the current block is coded by intra prediction or inter prediction or IBC mode, the current coefficient block size, coefficient block width, coefficient block height, and coefficient block aspect ratio. In some examples, the current CG includes the coefficients.

In an example, if a current block is intra coded, the number of context coded bins per coefficient for coding rem_abs_gt2_flag may be more than the number of context coded bins per coefficient for coding rem_abs_gt2_flag when current block is inter coded and/or IBC coded. Exemplary values of the number of context coded bins per coefficient for coding rem_abs_gt2flag when current block is inter coded include 3, 4, 5, and 6. Exemplary values of the number of context coded bins per coefficient for coding rem_abs_gt2_flag when current block is intra coded include 5, 6, 7, 8, and 9.

In an embodiment, for coefficient coding of the TS mode and/or the BDPCM mode, the maximum number of context coded bins of the syntax elements per CG or the maximum average number of context coded bins of the syntax elements per CG depends on coded information. The coded information includes the number of nonzero coefficients (e.g., number of coded sig_coeff_flag in the current CG), the number of nonzero coefficients (e.g., number of coded sig_coeff_flag) in the previously coded CG, whether the current block is coded by intra prediction or inter prediction or IBC mode, the current coefficient block size, coefficient block width, coefficient block height, and coefficient block aspect ratio. Setting a maximum number of context coded bins not only boosts the coding speed, but also reduces required memory size and cost of maintaining the context models.

In an embodiment, for coefficient coding of the TS mode and/or the BDPCM mode, the parity bit flag (e.g., par_level_flag) which indicates the parity of absLevel may not be coded. Instead, the syntax elements sig_coeff_flag, abs_gt1_flag, abs_gt2_flag, the sign information, and abs_remainder are coded.

In an example, the syntax elements sig_coeff_flag and abs_gt1_flag may be coded in the first pass. The syntax element abs_gt2_flag may be coded in the second pass. The syntax element abs_remainder may be coded in the third pass. If necessary, the sign information may be coded in the fourth pass.

In another example, the syntax elements sig_coeff_flag, abs_gt1_flag, and sign information may be coded in the first pass. The syntax element abs_gt2_flag may be coded in the second pass. The syntax element abs_remainder may be coded in the fourth pass.

In an embodiment, for coefficient coding of the TS mode and/or the BDPCM mode, in addition to the syntax elements rem_abs_gt1_flag (e.g., which indicates absLevel is greater than 1), and rem_abs_gt2_flag (e.g., which indicates absLevel is greater than 3), additional syntax elements rem_abs_gt3_flag (e.g., which indicates absLevel is greater than 5) and/or rem_abs_gt4_flag (e.g., which indicates absLevel is greater than 7) may be also signaled. The syntax elements rem_abs_gt3_flag and/or rem_abs_gt4_flag may use separate contexts for entropy coding.

In an embodiment, for coefficient coding of the TS mode and/or the BDPCM mode, when coding the sign information for each non-zero coefficient, the context may depend on previously coded sign bit values.

Figure 13B:
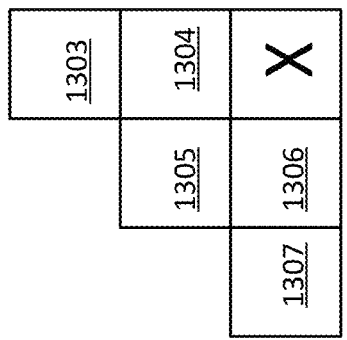
FIG. 13B shows an example of the context used for coding the sign information of a current coefficient in accordance with an embodiment.
Figure 13A:
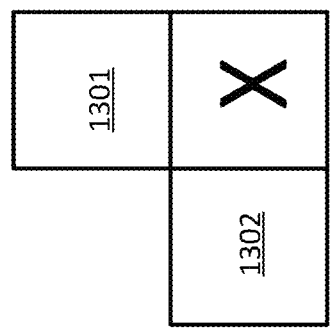
FIG. 13A shows an example of the context used for coding the sign information of a current coefficient in accordance with an embodiment.

In an example, FIG. 13A shows that the context used for coding the sign information includes the above block (1301) and the left block (1302) of the current coefficient (marked as X). In an example, FIG. 13B shows that the context used for coding the sign information includes multiple above and left blocks (1303, 1304, 1305, 1306, and 1307) of the current coefficient (marked as X).

In an embodiment, the context used for coding the sign information depends on the previously coded N sign bits. Exemplary values of N include 1, 2, 3, and 4.

In an embodiment, instead of coding the sign information, a sign residual is coded, and the sign residual bit indicates whether the current sign bit is equal to a predicted sign bit value. In an example, the predicted sign bit is derived using previous scanned N sign bits. Exemplary values of N include 1, 2, 3, and 4. In another example, the predicted sign bit is derived using left and/or top neighboring sign bit values.

In an embodiment, for coefficient coding of the TS mode and/or the BDPCM mode, when coding the magnitude of coefficients, one or more primary level values may be first signaled, then the residual of each non-zero coefficient minus one of these primary level values are signaled. In an embodiment, the primary level values are limited to a given threshold. In an embodiment, the number of primary level values is limited to a given threshold, such as 1, 2, 3, or 4.

In an embodiment, when multiple primary level values are signaled, then the primary level values are arranged in an ascending order, then for each coefficient, starting from the smallest primary level value, a flag indicating whether the current coefficient has a level value greater than the current primary level value is signaled. In an example, when the current coefficient has a level value which is not greater than the current primary level value, then the difference between the current level value and the previous primary level value is signaled.

VII. Exemplary Decoding Processes

Figure 14:
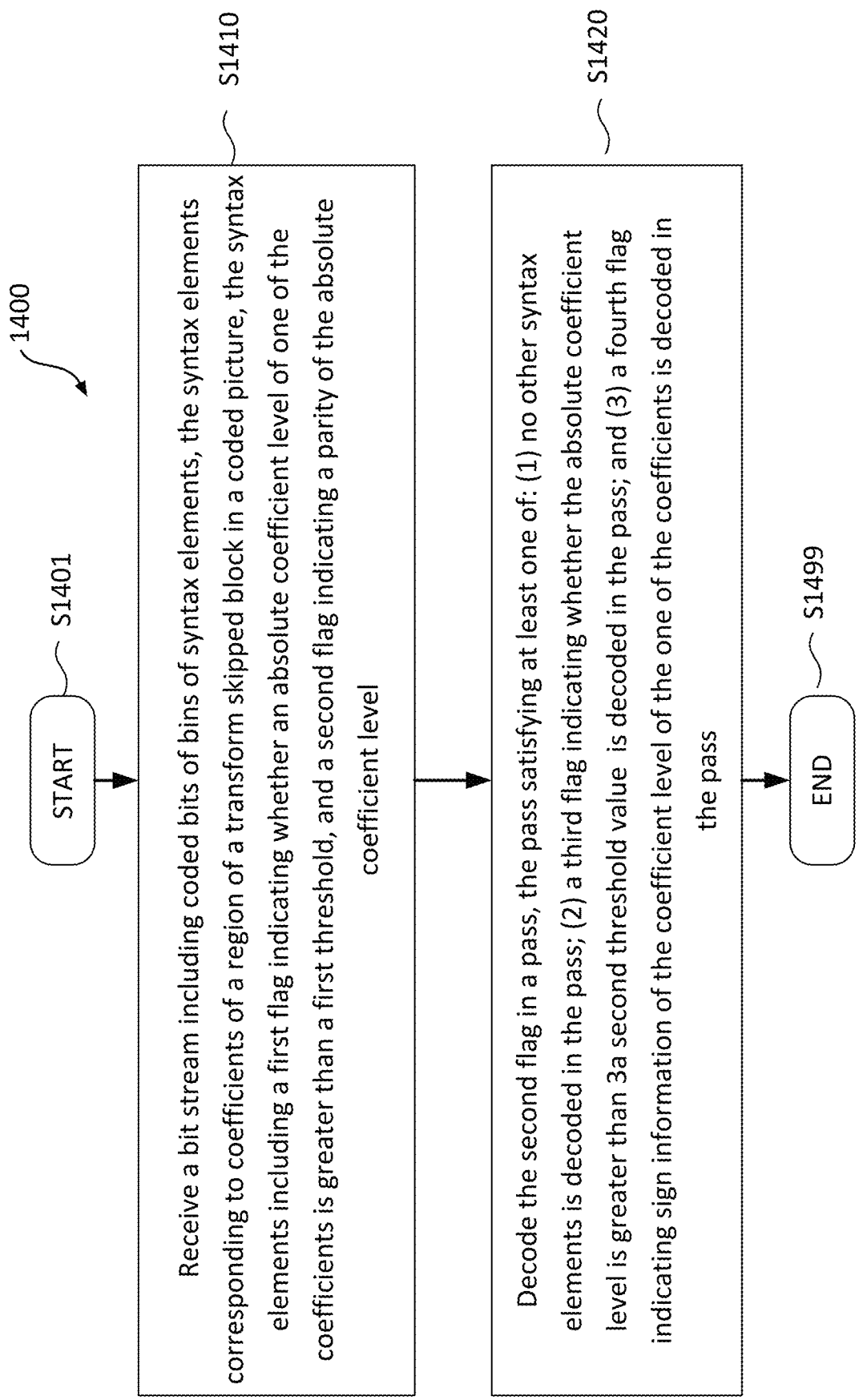
FIG. 14 shows a flow chart outlining a coefficient decoding process in accordance with an embodiment.

FIG. 14 shows a flow chart outlining a coefficient decoding process (1400) according to some embodiments of the disclosure. The process (1400) can be used in entropy decoding of several types of coefficient syntax elements. In various embodiments, the process (1400) can be executed by processing circuitry, such as the processing circuitry in the terminal devices (210), (220), (230) and (240), the processing circuitry that performs functions of the video decoder (310), the processing circuitry that performs functions of the video decoder (410), and the like. In some embodiments, the process (1400) is implemented in software instructions, thus when the processing circuitry executes the software instructions, the processing circuitry performs the process (1400). The process starts at (S1401) and proceeds to (S1410).

At (S1410), a bit stream including coded bits of bins of syntax elements is received. The syntax elements correspond to coefficients of a region of a transform skipped block in a coded picture, and include a first flag and a second flag. The first flag indicates whether an absolute coefficient level of one of the coefficients is greater than a first threshold (e.g., 1), and the second flag indicates a parity of the absolute coefficient level. For example, the first flag may be a significance syntax element (e.g., sig_coeff_flag) that indicates that an absolute value of the current coefficient (e.g., absLevel) is greater than the first threshold. The second flag may be a parity syntax element (e.g., par_level_flag) that indicates the parity of absLevel. The transform skipped block may indicate that a transform was not performed on the transform block. For example, when the current block is coded with BDPCM, a transform is not performed on the transform block.

At (S1420), the second flag is decoded in a separate pass. For example, the pass satisfies at least one of: (1) no other syntax elements is decoded in the pass, (2) a third flag indicating whether the absolute coefficient level is greater than a second threshold (e.g., 3) is decoded in the pass, and (3) a fourth flag indicating sign information of the coefficient level of the one of the coefficients is decoded in the pass. The second threshold is greater than the first threshold in some embodiments. In an example, the second flag, which is a parity syntax element, may be decoded in a separate pass after the first flag and a fifth flag are decoded. The fifth flag indicates whether the absolute coefficient level is greater than a third threshold (e.g., 3). In an example, the second flag is decoded in a separate pass after the third flag is decoded in a previous pass. In an example, the second flag is decoded in the same pass with the third flag or the fourth flag. The process (1400) proceeds to and terminates at (S1499).

Figure 15:
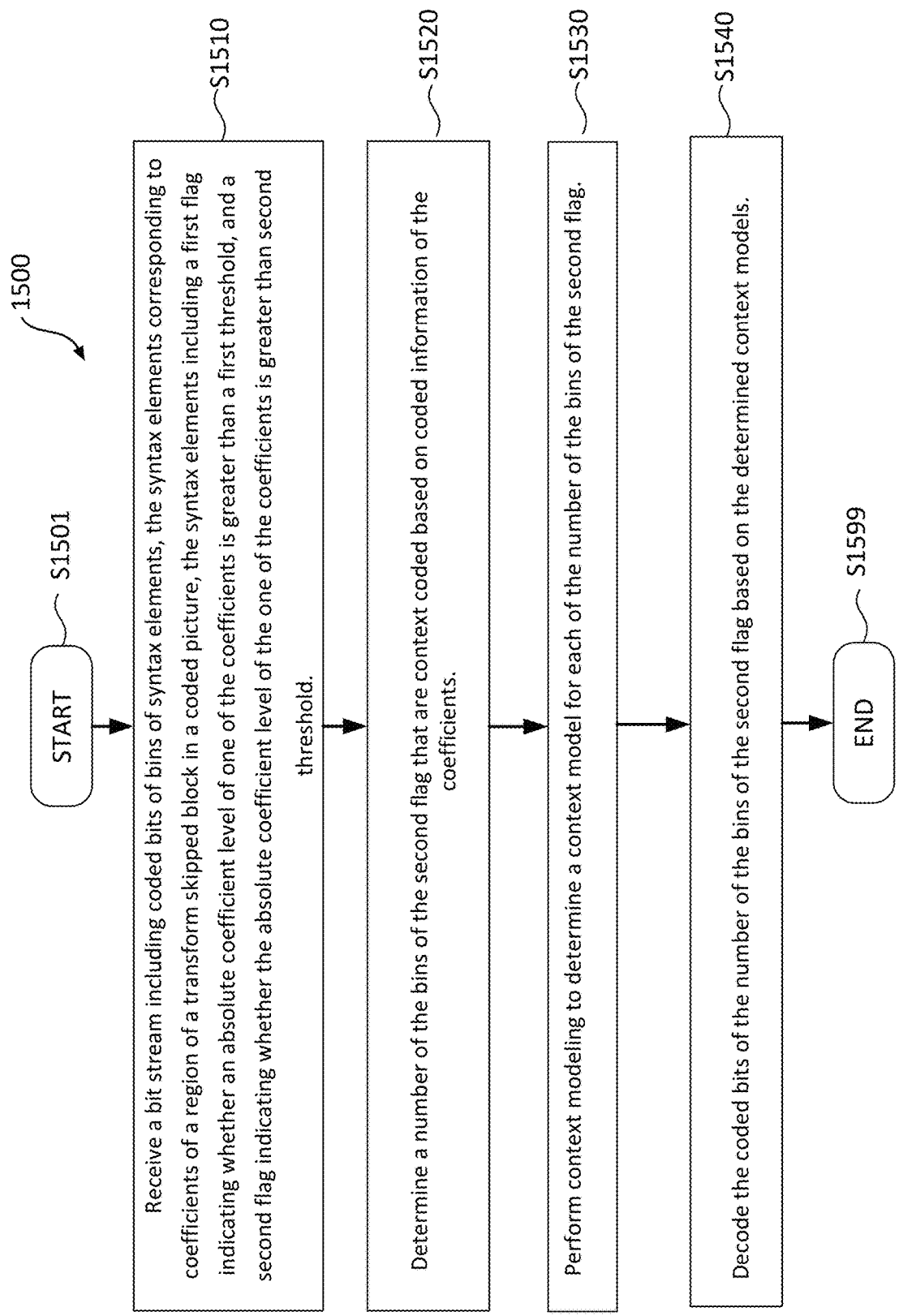
FIG. 15 shows a flow chart outlining a coefficient decoding process in accordance with an embodiment.

FIG. 15 shows a flow chart outlining a coefficient decoding process (1500) according to some embodiments of the disclosure. The process (1500) can be used in entropy decoding of several types of coefficient syntax elements. In various embodiments, the process (1500) can be executed by processing circuitry, such as the processing circuitry in the terminal devices (210), (220), (230) and (240), the processing circuitry that performs functions of the video decoder (310), the processing circuitry that performs functions of the video decoder (410), and the like. In some embodiments, the process (1500) is implemented in software instructions, thus when the processing circuitry executes the software instructions, the processing circuitry performs the process (1500). The process starts at (S1501) and proceeds to (S1510).

At (S1510), a bit stream including coded bits of bins of syntax elements is received. The syntax elements correspond to coefficients of a region of a transform skipped block in a coded picture, and include a first flag and a second flag. The first flag indicates whether an absolute coefficient level of one of the coefficients is greater than a first threshold (e.g., 1), and the second flag indicates whether the absolute coefficient level of the one of the coefficients is greater than a second threshold (e.g., 3). The second threshold is greater than the first threshold in some embodiments. For example, the first flag may be a significance syntax element (e.g., sig_coeff_flag) that indicates that an absolute value of the current coefficient (e.g., absLevel) is greater than the first threshold. The second flag may be a greater than 2 syntax element (e.g., rem_abs_gt2_flag), which indicates whether the absolute transform coefficient level of the respective transform coefficient is greater than the second threshold. The transform skipped block may indicate that a transform was not performed on the transform block. For example, when the current block is coded with BDPCM, a transform is not performed on the transform block.

At (S1520), a number of the bins of the second flag that are context coded is determined based on coded information of the coefficients. For example, the coded information of the coefficients includes a number of the first flag in a current coefficient group (CG) including the coefficients, a number the first flag in a previous CG, whether a current block corresponding to the transform skipped block is intra coded or inter coded, a size of the transform skipped block, a width of the transformed skipped block, a height of the transformed skipped block, or an aspect ratio of the transformed skipped block. The previous CG may be a neighboring CG that has been scanned. In one example, when the current block is intra coded, the number of the bins of the second flag is more than the number of the bins of the second flag when the current block is inter coded.

At (S1530), context modeling is performed to determine a context model for each of the number of the bins of the second flag. The number of the bins of the second flag that are context coded may not exceed the number determined at S1520.

At (S1540), the coded bits of the number of the bins of the second flag are decoded based on the determined context models. The coded bits of the remaining total number of the bins of the second flag for the region of the transform skipped block may be decoded based on an EP model (i.e., a bypass model). Based on the recovered bins, coefficient levels of the coefficients can be reconstructed. The process (1500) proceeds to and terminates at (S1599).

Figure 16:
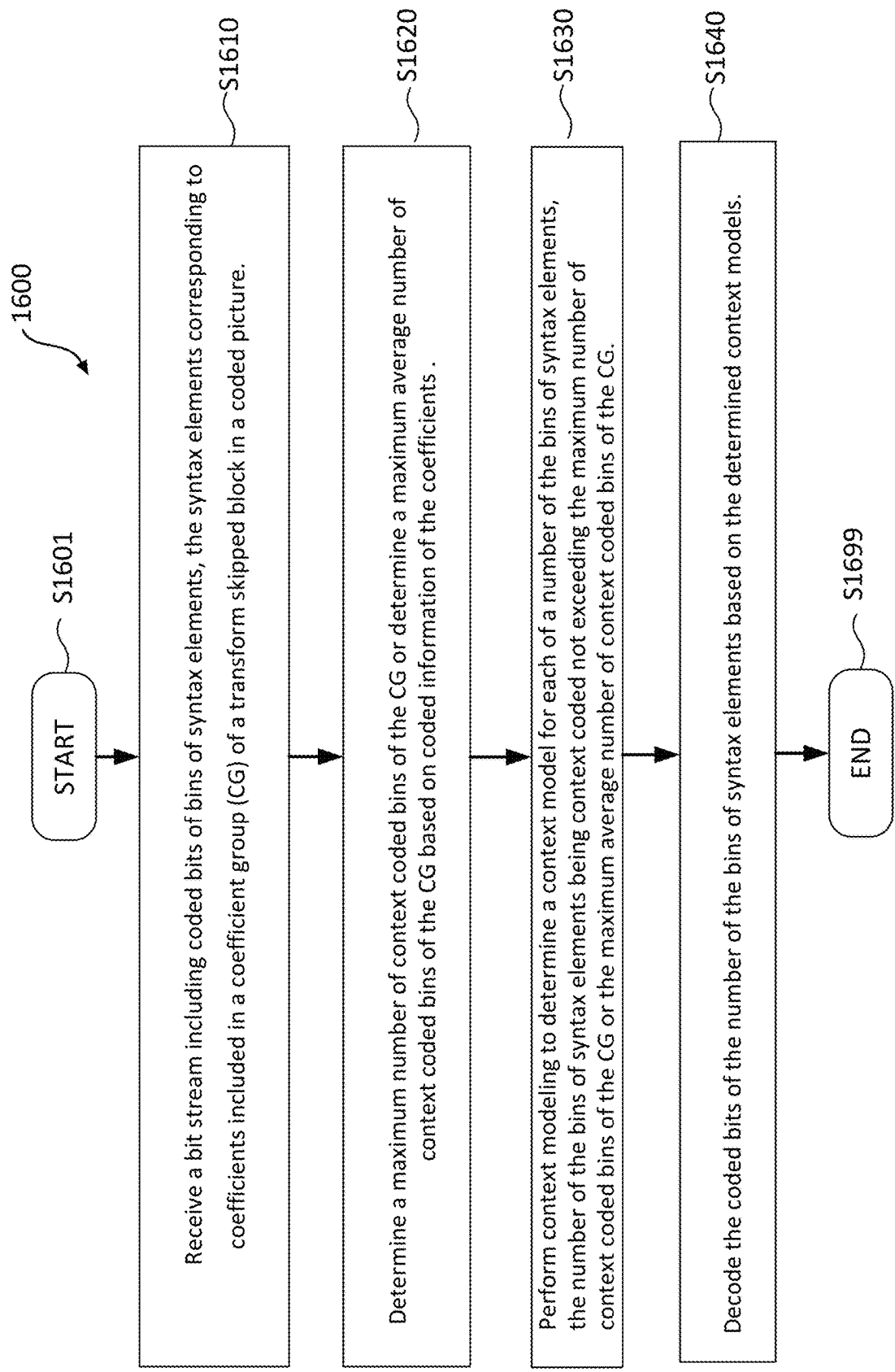
FIG. 16 shows a flow chart outlining a coefficient decoding process in accordance with an embodiment.

FIG. 16 shows a flow chart outlining a coefficient decoding process (1600) according to some embodiments of the disclosure. The process (1600) can be used in entropy decoding of several types of coefficient syntax elements. In various embodiments, the process (1600) can be executed by processing circuitry, such as the processing circuitry in the terminal devices (210), (220), (230) and (240), the processing circuitry that performs functions of the video decoder (310), the processing circuitry that performs functions of the video decoder (410), and the like. In some embodiments, the process (1600) is implemented in software instructions, thus when the processing circuitry executes the software instructions, the processing circuitry performs the process (1600). The process starts at (S1601) and proceeds to (S1610).

At (S1610), a bit stream including coded bits of bins of syntax elements is received. The syntax elements correspond to coefficients included in a coefficient group (CG) of a transform skipped block in a coded picture. The CG may be partitioned by a transform skipped block/coefficient block and may include 4×4 coefficient positions. The transform skipped block may indicate that a transform was not performed on the transform block. For example, when the current block is coded with BDPCM, a transform is not performed on the transform block.

At (S1620), a maximum number of context coded bins of the CG or a maximum average number of context coded bins of the CG is determined based on coded information of the coefficients. For example, the coded information of the coefficients includes a number of the first flag in the CG including the coefficients, a number the first flag in a previous CG, whether a current block corresponding to the transform skipped block is intra coded or inter coded, a size of the transform skipped block, a width of the transformed skipped block, a height of the transformed skipped block, or an aspect ratio of the transformed skipped block. The previous CG may be a neighboring CG that has been scanned.

At (S1630), context modeling is performed to determine a context model for each of a number of the bins of syntax elements in the CG. The number of the bins of syntax elements in the CG being context coded may not exceed the maximum number of context coded bins of the CG or the maximum average number of context coded bins of the CG determined at S1620.

At (S1640), the coded bits of the number of the bins of syntax elements are decoded based on the determined context models. The coded bits of the remaining total number of the bins of syntax elements in the CG may be decoded based on an EP model (i.e., a bypass model). Based on the recovered bins, coefficient levels of the coefficients can be reconstructed. The process (1600) proceeds to and terminates at (S1699).

VIII. Computer System

The techniques described above, can be implemented as computer software using computer-readable instructions and physically stored in one or more computer-readable media. For example, FIG. 17 shows a computer system (1700) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 17:
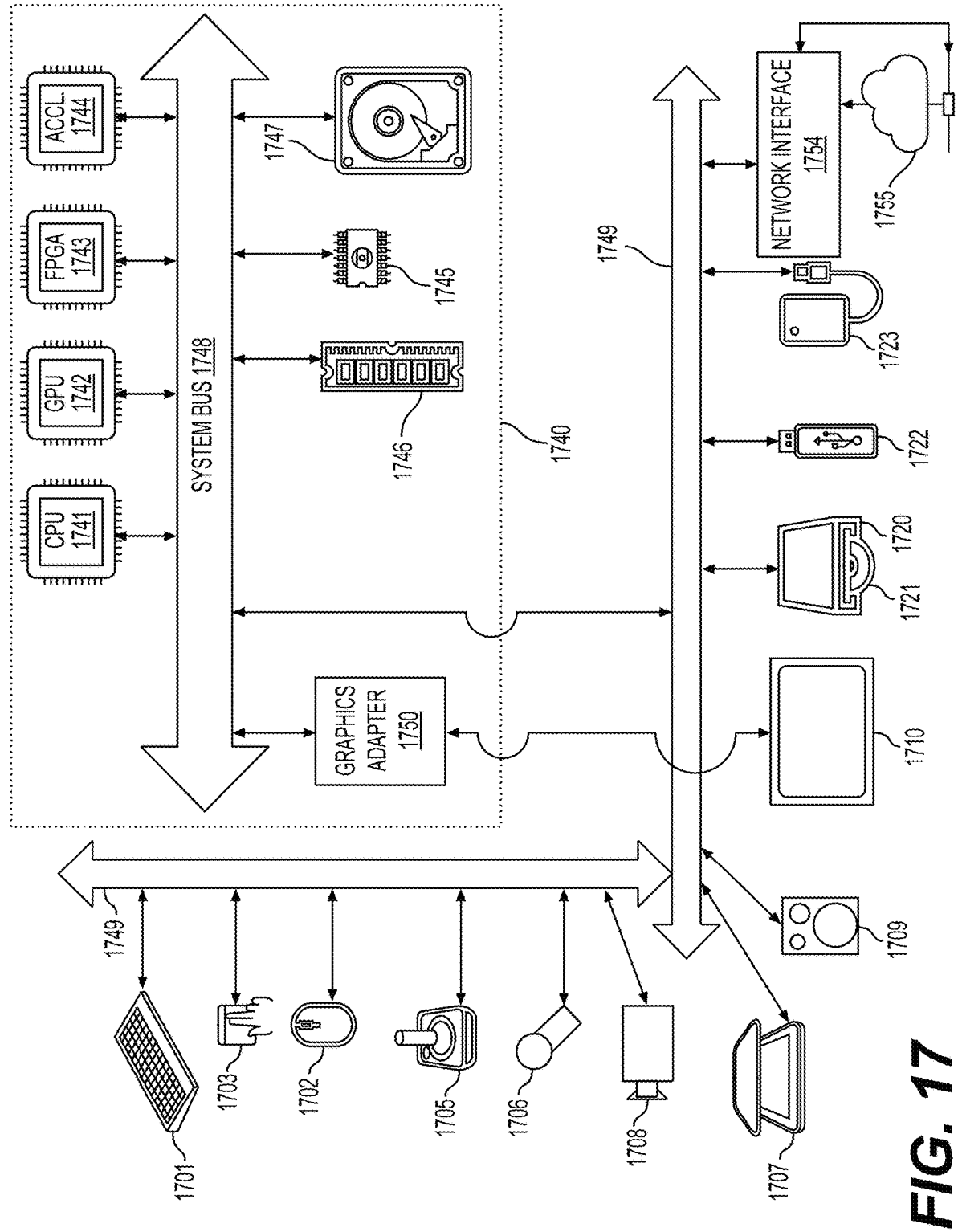
FIG. 17 is a schematic illustration of a computer system in accordance with an embodiment.

The components shown in FIG. 17 for computer system (1700) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1700).

Computer system (1700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1701), mouse (1702), trackpad (1703), touch screen (1710), data-glove (not shown), joystick (1705), microphone (1706), scanner (1707), camera (1708).

Computer system (1700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1710), data-glove (not shown), or joystick (1705), but there can also be tactile feedback devices that do not serve as input devices), audio output devices (such as: speakers (1709), headphones (not depicted)), visual output devices (such as screens (1710) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1700) can also include human accessible storage devices and their associated media such as optical media including CD/DVD ROM/RW (1720) with CD/DVD or the like media (1721), thumb-drive (1722), removable hard drive or solid state drive (1723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1700) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1749) (such as, for example USB ports of the computer system (1700)); others are commonly integrated into the core of the computer system (1700) by attachment to a system bus as described below (for example Ethernet interface into a PC computer system or cellular network interface into a smartphone computer system). Using any of these networks, computer system (1700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1740) of the computer system (1700).

The core (1740) can include one or more Central Processing Units (CPU) (1741), Graphics Processing Units (GPU) (1742), specialized programmable processing units in the form of Field Programmable Gate Areas (FPGA) (1743), hardware accelerators for certain tasks (1744), and so forth. These devices, along with Read-only memory (ROM) (1745), Random-access memory (1746), internal mass storage such as internal non-user accessible hard drives, SSDs, and the like (1747), may be connected through a system bus (1748). In some computer systems, the system bus (1748) can be accessible in the form of one or more physical plugs to enable extensions by additional CPUs, GPU, and the like. The peripheral devices can be attached either directly to the core's system bus (1748), or through a peripheral bus (1749). Architectures for a peripheral bus include PCI, USB, and the like.

CPUs (1741), GPUs (1742), FPGAs (1743), and accelerators (1744) can execute certain instructions that, in combination, can make up the aforementioned computer code. That computer code can be stored in ROM (1745) or RAM (1746). Transitional data can be also be stored in RAM (1746), whereas permanent data can be stored for example, in the internal mass storage (1747). Fast storage and retrieve to any of the memory devices can be enabled through the use of cache memory, that can be closely associated with one or more CPU (1741), GPU (1742), mass storage (1747), ROM (1745), RAM (1746), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1700), and specifically the core (1740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1740) that are of non-transitory nature, such as core-internal mass storage (1747) or ROM (1745). The software implementing various embodiments of the present disclosure can be stored in such devices and executed by core (1740). A computer-readable medium can include one or more memory devices or chips, according to particular needs. The software can cause the core (1740) and specifically the processors therein (including CPU, GPU, FPGA, and the like) to execute particular processes or particular parts of particular processes described herein, including defining data structures stored in RAM (1746) and modifying such data structures according to the processes defined by the software. In addition or as an alternative, the computer system can provide functionality as a result of logic hardwired or otherwise embodied in a circuit (for example: accelerator (1744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
DPCM: Differential Pulse-code Modulation
BDPCM: Block Differential Pulse-code Modulation
SCC: Screen Content Coding
Bs: Boundary Strength While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding performed in a video decoder, the method comprising:
    receiving a bit stream including bins of syntax elements, the syntax elements corresponding to coefficients of a region of a transform skipped block in a coded picture, the syntax elements including a first flag indicating whether an absolute coefficient level of one of the coefficients is greater than a first threshold value, and a second flag indicating a parity of the absolute coefficient level; and
    decoding the second flag in a pass without decoding other syntax elements after decoding the first flag and a fifth flag indicating whether the absolute coefficient level is greater than 3 in a previous pass, wherein the pass satisfies at least one of: (1) no other syntax elements is decoded in the pass; (2) a third flag indicating whether the absolute coefficient level is greater than a second threshold value is decoded in the pass; and (3) a fourth flag indicating sign information of the coefficient level of the one of the coefficients is decoded in the pass, the second threshold value being greater than the first threshold value.

2. The method of claim 1, wherein the first threshold value is 1 and the second threshold value is 3.

3. The method of claim 1, wherein a current block corresponding to the transform skipped block is coded with a block differential pulse-code modulation mode.

4. The method of claim 1, wherein the decoding further comprises:
    decoding the second flag in the pass without decoding other syntax elements after decoding the third flag in a previous pass.

5. The method of claim 1, wherein the decoding further comprises:
    decoding the second flag in the same pass with the third flag.

6. The method of claim 1, wherein the decoding further comprises:
    decoding the second flag in the same pass with the fourth flag.

7. An apparatus of video decoding, comprising: processing circuitry configured to:
    receive a bit stream including bins of syntax elements, the syntax elements corresponding to coefficients of a region of a transform skipped block in a coded picture, the syntax elements including a first flag indicating whether an absolute coefficient level of one of the coefficients is greater than a first threshold, and a second flag indicating a parity of the absolute coefficient level; decode the second flag in a pass without other syntax elements after
    decoding the first flag and a fifth flag indicating whether the absolute coefficient level is greater than 3 in a previous pass, wherein the pass satisfies at least one of: (1) no other syntax elements is decoded in the pass; (2) a third flag indicating whether the absolute coefficient level is greater than a second threshold is decoded in the pass; and (3) a fourth flag indicating sign information of the coefficient level of the one of the coefficients is decoded in the pass, the second threshold being greater than the first threshold.

8. The apparatus of claim 7, wherein a current block corresponding to the transform skipped block is coded with a block differential pulse-code modulation mode.

9. The apparatus of claim 7, wherein the processing circuitry is further configured to decode the second flag in the separate pass after decoding the third flag in a previous pass.

10. The apparatus of claim 7, wherein the processing circuitry is further configured to decode the second flag in the same pass with the third flag.

11. The apparatus of claim 7, wherein the processing circuitry is further configured to decode the second flag in the same pass with the fourth flag.

* * * * *